(12) United States Patent
Noma

(10) Patent No.: US 10,783,152 B2
(45) Date of Patent: Sep. 22, 2020

(54) INFORMATION PROCESSING APPARATUS AND DATA COMPARISON METHOD

(71) Applicant: FUJITSU LIMITED, Kawasaki-shi, Kanagawa (JP)

(72) Inventor: Yui Noma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 564 days.

(21) Appl. No.: 15/381,576

(22) Filed: Dec. 16, 2016

(65) Prior Publication Data

US 2017/0228376 A1 Aug. 10, 2017

(30) Foreign Application Priority Data

Feb. 5, 2016 (JP) .................................. 2016-020424

(51) Int. Cl.
*G06F 16/2457* (2019.01)
*G06K 9/62* (2006.01)
(Continued)

(52) U.S. Cl.
CPC .. *G06F 16/24578* (2019.01); *G06F 16/90335* (2019.01); *G06K 9/00885* (2013.01); (Continued)

(58) Field of Classification Search
CPC ............................................... G06F 16/24578
See application file for complete search history.

(56) References Cited

U.S. PATENT DOCUMENTS

2003/0009456 A1 1/2003 Shintani et al.
2005/0228783 A1* 10/2005 Shanahan ........... G06F 16/3347
(Continued)

FOREIGN PATENT DOCUMENTS

JP 2002-278761 A 9/2002
JP 2009-523270 A 6/2009
(Continued)

OTHER PUBLICATIONS

Rajendra Shinde et al., "Similarity Search and Locality Sensitive Hashing using Ternary Content Addressable Memories", SIGMOD '10 Proceedings of the 2010 ACM SIGMOD International Conference on Management of Data, Jun. 6-11, 2010, pp. 375-386(Total 12 pages).

*Primary Examiner* — Mark D Featherstone
*Assistant Examiner* — Tony Wu
(74) *Attorney, Agent, or Firm* — Fujitsu Patent Center

(57) ABSTRACT

A storage unit stores hyperplane information indicating a first hyperplane, and second and third hyperplanes parallel to the first hyperplane. A computing unit generates a first binary value based on whether the position of a first feature vector is in the direction of a normal vector relative to the second hyperplane, a second binary value based on whether the position of the first feature vector is in the direction of the normal vector relative to the third hyperplane, and a third binary value based on whether the position of a second feature vector is in the direction of the normal vector relative to the first hyperplane, and determines a degree of similarity between the pieces of comparison data, based on a result of multiplying the exclusive OR result of the first and third binary values and the exclusive OR result of the second and third binary values.

4 Claims, 20 Drawing Sheets

(51) Int. Cl.
*G06K 9/00* (2006.01)
*G06F 16/903* (2019.01)
*G06K 9/38* (2006.01)

(52) U.S. Cl.
CPC .............. *G06K 9/38* (2013.01); *G06K 9/6202* (2013.01); *G06K 9/6215* (2013.01); *G06K 9/6286* (2013.01); G06K 2009/00932 (2013.01)

(56) References Cited

U.S. PATENT DOCUMENTS

| | | | |
|---|---|---|---|
| 2008/0133628 A1* | 6/2008 | Giri | G06F 7/02 708/230 |
| 2008/0195322 A1* | 8/2008 | Altschuler | G16B 40/00 702/19 |
| 2009/0024555 A1 | 1/2009 | Rieck et al. | |
| 2010/0250542 A1* | 9/2010 | Fujimaki | G06K 9/6269 707/737 |
| 2013/0262488 A1 | 10/2013 | Shirakawa et al. | |
| 2013/0262489 A1 | 10/2013 | Shirakawa | |

FOREIGN PATENT DOCUMENTS

| | | |
|---|---|---|
| JP | 2009-230169 A | 10/2009 |
| JP | 2010-287135 A | 12/2010 |
| JP | 2011-221689 A | 11/2011 |
| JP | 2013-206187 A | 10/2013 |
| JP | 2013-206193 A | 10/2013 |

\* cited by examiner

| x | y | $b_C(x) \oplus b_L(y)$ | $b_C(x) \oplus b_R(y)$ | MXOR(x,y) |
|---|---|---|---|---|
| q1 | a1 | 0 | 0 | 0 |
| q1 | a2 | 1 | 0 | 0 |
| q1 | a3 | 1 | 0 | 0 |
| q1 | a4 | 1 | 1 | 1 |
| q2 | a1 | 1 | 1 | 1 |
| q2 | a2 | 0 | 1 | 0 |
| q2 | a3 | 0 | 1 | 0 |
| q2 | a4 | 0 | 0 | 0 |

FIG. 7

SEARCH AND MATCHING PROCESS

INFORMATION PROCESSING APPARATUS AND DATA COMPARISON METHOD

CROSS-REFERENCE TO RELATED APPLICATION

This application is based upon and claims the benefit of priority of the prior Japanese Patent Application No. 2016-020424, filed on Feb. 5, 2016, the entire contents of which are incorporated herein by reference.

FIELD

The embodiments discussed herein relate to an information processing apparatus and a data comparison method.

BACKGROUND

Considering the use and application of unstructured data, such as video, audio, or sensor data, similarity search for such data is useful. The similarity search for unstructured data is used to confirm the current state from similar past data or to perform matching for individual authentication or others.

As a technology using the similarity search for unstructured data, there is a biometric authentication technology, such as palm vein authentication. For example, vein authentication performed at an Automatic Teller Machine (ATM) of a bank is to verify that a person operating the ATM is the owner of the cash card. For this verification, one-to-one matching is performed between the vein data of the person operating the ATM and the previously registered vein data of the owner of the cash card. If a person loses a cash card due to a disaster or the like, the person visits the bank and is verified using all data held by the bank. Furthermore, when an employee passes through a security gate to enter the building of a company, he is verified by biometric authentication using vein or the like, not using a card. In this case, the vein data of the employee going through the security gate is matched against all pieces of vein data held by the company. However, the matching between pieces of vein data imposes a high processing load and needs too much time to match the vein data of an employee who wants to go through the security gate against all the pieces of the registered vein data.

To deal with this, there is considered a technique of extracting feature vectors from all registered vein data in advance, and in a similar search for unstructured data, extracting a plurality of pieces of similar data to a feature vector extracted from query vein data. The extracted pieces of similar data are then subjected to a matching process. This approach reduces the amount of data to be matched, thereby reducing the overall processing time. In this connection, what is important to reduce the overall processing time is a short processing time taken for the similarity search.

High-dimensional feature vectors are mostly obtained from data such as vein data. The similarity search using such high-dimensional vectors is not performed efficiently, and the processing time for the search linearly depends on the number of records of the feature vectors to be searched. To accelerate such similarity search, there is considered a technique of dividing a high-dimensional space by a hyperplane, assigning "0" or "1" to each divided region, and converting feature vectors to binary strings. A hamming distance between obtained binary strings reflects a similarity between their original feature vectors. In addition, the hamming distance between binary strings is calculated at a high speed, compared with the case of directly calculating a similarity between feature vectors. Furthermore, each binary string is a very small amount of data, so that the processing may be accelerated by storing the binary strings of feature vectors on a memory.

In the above technique of converting feature vectors to binary strings, all feature vectors are converted to binary strings in advance, and the binary strings are held in a computer. Then, when receiving a search request including vein data as a query, the computer converts the query to a binary string and then obtains neighboring data by a similarity search using the hamming distance between binary strings, at the first step. Then, the computer performs a matching process using the neighboring data as data to be matched, at the second step.

However, in the case where a space is divided by a hyperplane, the generation of a binary value from data close to the dividing plane is very sensitive to a slight difference in the noise of data or the setting of the position of the hyperplane. Therefore, the above search and matching process at the two steps may fail in extracting matching data that is to be finally singled out, at the first stage. If the matching data to be finally singled out fails to be extracted at the first stage, the matching process at the second stage fails in obtaining a correct matching result. If such a failure occurs in the palm vein authentication, for example, a rightful person may be rejected in error.

To prevent failures in extracting matching data to be finally singled out, for example, there is a method of providing a hyperplane with a margin in the conversion process and converting a feature vector to three values {0, 1, *}, instead of conversion to binary. This method converts a value of the feature vector within the margin of the hyperplane into and calculates a hamming distance considering "*" as a wildcard (that stands for either "0" or "1")

Please see, for example, Japanese Laid-open Patent Publication Nos. 2009-230169, 2010-287135, and 2011-221689.

Please also see, for example, R. Shinde et al., "Similarity Search and Locality Sensitive Hashing using Ternary Content Addressable Memories", SIGMOD '10 Proceedings of the 2010 ACM SIGMOD International Conference on Management of data, June 2010, Pages 375-386.

As described above, by providing a hyperplane with a margin, a short hamming distance is calculated between a feature vector within the range of the margin of the hyperplane and query data existing in either region obtained by dividing the space by the hyperplane. This results in preventing the failures in extracting matching data to be finally singled out.

However, providing a hyperplane with a margin increases the amount of data to be matched and thus increases the processing load. For example, in the case where a memory for holding three values is not installed in a general computer and feature vectors are each converted to three values {0, 1, *}, it is difficult for the general computer to calculate the hamming distance efficiently. To deal with this, there is considered a technique of generating a binary string in which "0" is assigned to elements corresponding to wildcards in the binary string corresponding to one feature vector and a binary string in which "1" is assigned to these elements, instead of using the wildcards. For example, two binary strings (1, 0, 1) and (1, 1, 1) are generated from the binary string (1, *, 1) including a wildcard. In this method, however, if N elements (N is an integer of one or greater) are wildcards, $2^N$ binary strings are generated from one feature vector. This results in an increase in the amount of data to be searched in the similarity search and thus in the processing load.

SUMMARY

According to one aspect, there is provided an information processing apparatus including: a memory which stores therein hyperplane information indicating a first hyperplane, a second hyperplane, and a third hyperplane that are provided in a space of a prescribed number of dimensions, the second hyperplane being provided on a side in a direction of a normal vector of the first hyperplane and in parallel to the first hyperplane with a prescribed gap between the second hyperplane and the first hyperplane, the third hyperplane being provided on an opposite side to the direction of the normal vector of the first hyperplane and in parallel to the first hyperplane with a prescribed gap between the third hyperplane and the first hyperplane; and a processor which performs a procedure including obtaining a first feature vector representing a feature of first comparison data as a position within the space, generating a first binary value, based on whether the position represented by the first feature vector is in the direction of the normal vector relative to the second hyperplane, generating a second binary value, based on whether the position represented by the first feature vector is in the direction of the normal vector relative to the third hyperplane, obtaining a second feature vector indicating a feature of second comparison data as a position within the space, generating a third binary value, based on whether the position represented by the second feature vector is in the direction of the normal vector relative to the first hyperplane, and determining a degree of similarity between the first comparison data and the second comparison data, based on a result of multiplying results of a first exclusive OR of the first binary value and the third binary value and a second exclusive OR of the second binary value and the third binary value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates examples of calculating a degree of non-similarity;

DESCRIPTION OF EMBODIMENTS

Figure 1:
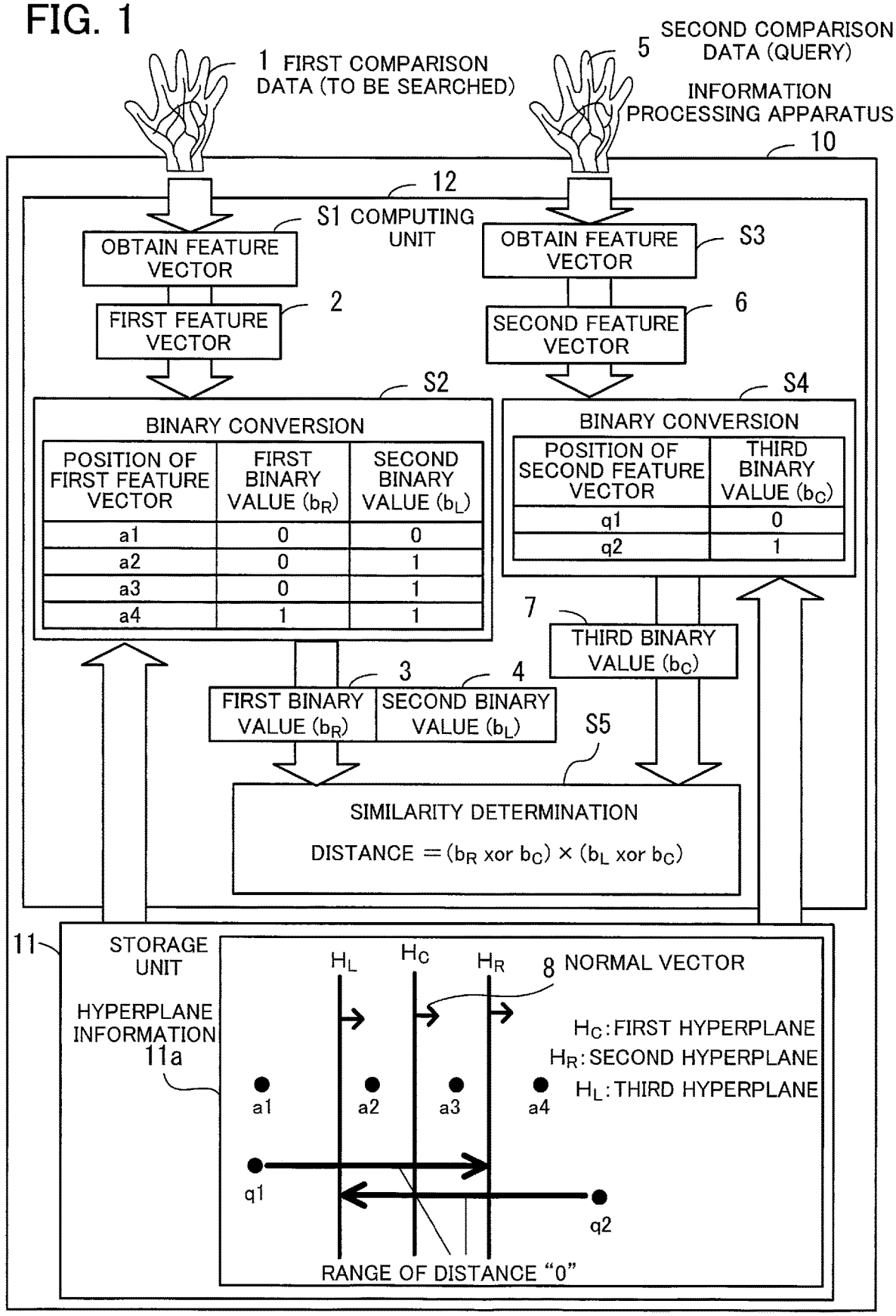
FIG. 1 illustrates an example of a functional configuration of an information processing apparatus according to a first embodiment.

Several embodiments will be described below with reference to the accompanying drawings, wherein like reference numerals refer to like elements throughout. It is noted that one or more of the embodiments may be combined as long as the combined embodiments are not mutually exclusive.

First Embodiment

A first embodiment will be described. The first embodiment is that two kinds of binary strings are held for each record to be searched, another kind of binary string is generated from data entered as a query, and computations between the binary strings are performed, in order to enable similarity determination using a hyperplane with a margin.

FIG. 1 illustrates an example of a functional configuration of an information processing apparatus according to the first embodiment. An information processing apparatus 10 includes a storage unit 11 and a computing unit 12.

The storage unit 11 stores therein hyperplane information 11a indicating a first hyperplane $H_C$, a second hyperplane $H_R$, and a third hyperplane $H_L$ that are provided in a space of a prescribed number of dimensions. The normal vector 8 of the first hyperplane $H_C$ is set. The second hyperplane $H_R$ is provided in parallel to the first hyperplane $H_C$ with a prescribed gap therebetween, on the side in the direction of the normal vector 8 of the first hyperplane $H_C$. The third hyperplane $H_L$ is provided in parallel to the first hyperplane $H_C$ with a prescribed gap therebetween, on the opposite side to the direction of the normal vector 8 of the first hyperplane $H_C$.

The computing unit 12 obtains a first feature vector 2 representing the features of first comparison data 1 as a position within the space (step S1). For example, the computing unit 12 analyzes the first comparison data 1 on the basis of a plurality of indexes and calculates a numerical value for each analysis index. Then, the computing unit 12 generates the first feature vector 2 having the plurality of calculated numerical values as elements.

Then, the computing unit 12 performs a process (binary conversion) of converting the first feature vector to binary values on the basis of the second hyperplane $H_R$ and the third hyperplane $H_L$ (step S2). For example, the computing unit 12 generates a first binary value 3 on the basis of whether the position represented by the first feature vector 2 is in the direction of the normal vector 8 relative to the second hyperplane $H_R$. If the position represented by the first feature vector 2 is in the direction of the normal vector 8 relative to the second hyperplane $H_R$, the first binary value 3 is "1". If the position represented by the first feature vector 2 is in the opposite direction of the normal vector 8 relative to the second hyperplane $H_R$, the first binary value 3 is "0". Similarly, the computing unit 12 generates a second binary value 4 on the basis of whether the position represented by the first feature vector 2 is in the direction of the normal vector 8 relative to the third hyperplane $H_L$. If the position represented by the first feature vector 2 is in the direction of the normal vector 8 relative to the third hyperplane $H_L$, the second binary value 4 is "1". If the position represented by the first feature vector 2 is in the opposite direction of the normal vector 8 relative to the third hyperplane $H_L$, the second binary value 4 is "0".

In addition, the computing unit 12 obtains a second feature vector 6 representing the features of second comparison data 5 as a position within the space (step S3). For example, the computing unit 12 analyzes the second comparison data 5 on the basis of a plurality of indexes, and calculates a numerical value for each analysis index. Then, the computing unit 12 generates a second feature vector 6 having the plurality of calculated numerical values as elements. The second comparison data 5 is a query to search, for example, previously registered first comparison data 1 to find data similar to the second comparison data 5.

Then, the computing unit 12 performs a process (binary conversion) of converting the second feature vector to a binary value on the basis of the first hyperplane $H_C$ (step S4). For example, the computing unit generates a third binary value 7 on the basis of whether the position represented by the second feature vector 6 is in the direction of the normal vector 8 relative to the first hyperplane $H_C$. The third binary value 7 is generated in the same way as the first binary value 3. If the position represented by the second feature vector 6 is in the direction of the normal vector 8 relative to the first hyperplane $H_C$, the third binary value 7 is "1". If the position represented by the second feature vector 6 is in the opposite direction of the normal vector 8 relative to the first hyperplane $H_C$, the third binary value 7 is "0".

In this connection, the position represented by the first feature vector 2 or the second feature vector 6 in the above explanation is a position obtained by moving a prescribed point (for example, the coordinate origin of the space) by the value of each element of the feature vector in the corresponding coordinate axis. In addition, out of regions obtained by dividing the space by the first hyperplane $H_C$, a region including the position represented by the first feature vector 2 or the second feature vector 6 is referred to as a region to which the first feature vector 2 or the second feature vector 6 belongs.

Then, the computing unit 12 determines a degree of similarity between the first comparison data 1 and the second comparison data 5, on the basis of a result of multiplying the result of an exclusive OR of the first binary value 3 and the third binary value 7 and the result of an exclusive OR of the second binary value 4 and the third binary value 7. That is to say, taking the first binary value 3 as "$b_R$", the second binary value 4 as "$b_L$", and the third binary value 7 as "$b_C$", the following operation, "$(b_R \text{ xor } b_C) \times (b_L \text{ xor } b_C)$", is performed (xor indicates an exclusive OR operation). The result of this operation may be considered as a distance between the first comparison data 1 and the second comparison data 5. A shorter distance (a smaller value) means more similar between the first comparison data 1 and the second comparison data 5.

With the above process, two regions obtained by dividing the space by the first hyperplane $H_C$ are each provided with a margin, and then a degree of similarity between the first comparison data 1 and the second comparison data 5 is determined appropriately based on whether a region to which the first feature vector 2 belongs and a region to which the second feature vector 6 belongs are the same.

For example, assuming that the second feature vector 6 represents the position of the point q1 illustrated in FIG. 1, the third binary value 7 is "0". In this case, if at least one of the first binary value 3 and the second binary value 4 is "0", the result of computing the distance is "0". That is, if the position represented by the first feature vector 2 is any one of the points a1, a2, and a3 illustrated in FIG. 1, the distance is "0". That is, although the position of the point a3 and the position (point q1) represented by the second feature vector 6 belong to different regions out of the two regions obtained by dividing the space by the first hyperplane $H_C$, the position of the point a3 exists in the margin of the first hyperplane $H_C$, and therefore these points are considered to belong to the same region.

In addition, assuming that the second feature vector 6 represents the position of the point q2 illustrated in FIG. 1, the third binary value 7 is "1". In this case, if at least one of the first binary value 3 and the second binary value 4 is "1", the result of computing the distance is "0". That is, if the position represented by the first feature vector 2 is any of the points a2, a3, and a4 illustrated in FIG. 1, the distance is "0". That is, although the position of the point a2 and the position (point q2) represented by the second feature vector 6 belong to different regions out of the two regions obtained by dividing the space by the first hyperplane $H_C$, the position of the point a2 exists in the margin of the first hyperplane $H_C$, and therefore these points are considered to belong to the same region.

As described above, a similarity is determined, taking the margin into consideration. By doing so, in the vicinity of the first hyperplane $H_C$, it is possible to prevent feature vectors representing positions actually close to each other from being determined to be distant in error. In addition, in the first embodiment, only two binary values (2 bits) are set for the first comparison data 1 to be searched, with respect to one first hyperplane $H_C$ that is a boundary dividing the space. Even in the case where many first hyperplanes $H_C$ are provided, only two binary strings each having as many binary values as the number of first hyperplanes $H_C$ are generated for one piece of first comparison data 1. This prevents the number of binary strings held from becoming excessive. As a result, it is possible to reduce an increase in the processing load of the similarity determination caused by providing a hyperplane with a margin.

In this connection, the storage unit 11 may be designed to store many first hyperplanes $H_C$. In this case, the storage unit 11 stores a plurality of hyperplane sets each including a first hyperplane $H_C$, a second hyperplane $H_R$, and a third hyperplane $H_L$. When a plurality of first hyperplanes $H_C$ are provided, the computing unit 12 generates a first binary value, second binary value, and third binary value for each of the plurality of hyperplane sets. In addition, the computing unit 12 multiplies the result of the exclusive OR of the first binary value and the third binary value and the result of the exclusive OR of the second binary value and the third binary value, for each of the plurality of hyperplane sets. Then, the computing unit 12 determines the degree of similarity between the first comparison data 1 and the second comparison data 5 on the basis of the sum of the multiplication results of the hyperplane sets. For example, it is determined that a smaller total value indicates a higher degree of similarity. As described above, even when the space is divided by many first hyperplanes $H_C$, it is possible to achieve efficient similarity determination with operations using binary values.

In addition, the storage unit 11 may be designed to store therein a plurality of first feature vectors 2 generated respectively from the plurality of pieces of first comparison data 1 to be searched. In the case where a plurality of first feature vectors 2 are stored, the computing unit 12 is able to optimize the position of the first hyperplane $H_C$. For example, the computing unit 12 generates the first hyperplane $H_C$ passing through the position represented by the average vector of the plurality of first feature vectors. In addition, the computing unit 12 generates the second hyperplane $H_R$ and third hyperplane $H_L$ on the basis of the generated first hyperplane $H_C$. Then, the computing unit 12 stores hyperplane information 11a indicating the first hyperplane $H_C$, second hyperplane $H_R$, and third hyperplane $H_L$ in the storage unit 11. The first hyperplane $H_C$ is set so as to pass through the position represented by the average vector of the plurality of first feature vectors, so that almost the same number of first feature vectors may belong to the two regions with the first hyperplane $H_C$ as a boundary.

The above approach makes it possible to improve the reliability of the similarity determination. That is, in the case where one of the regions obtained by dividing the space by the first hyperplane $H_C$ has few first feature vectors, most first feature vectors belong to the same region, and a distance of "0" is obtained. In this case, using the first hyperplane $H_C$ does not contribute to appropriate similarity determination, despite an increase in processing load. On the other hand, the first hyperplane $H_C$ is set as a boundary between two regions so that almost the same number of first feature vectors belong to these two regions. By using the first hyperplane $H_C$ in this way, the case where a distance between feature vectors is "1" and the case where a distance between feature vectors is "0" occur with almost the same frequency. As a result, it is possible to perform appropriate similarity determination.

Note that the computing unit 12 may be implemented by using a processor provided in the information processing apparatus 10, for example. In addition, the storage unit 11 may be implemented by using a memory or storage device provided in the information processing apparatus 10, for example.

Second Embodiment

The following describes a second embodiment. The second embodiment is intended to prevent failures in extracting matching data that is to be finally singled out and to achieve fast identity verification in a system where the identity verification based on palm vein is performed at an entrance to an office.

Figure 2:
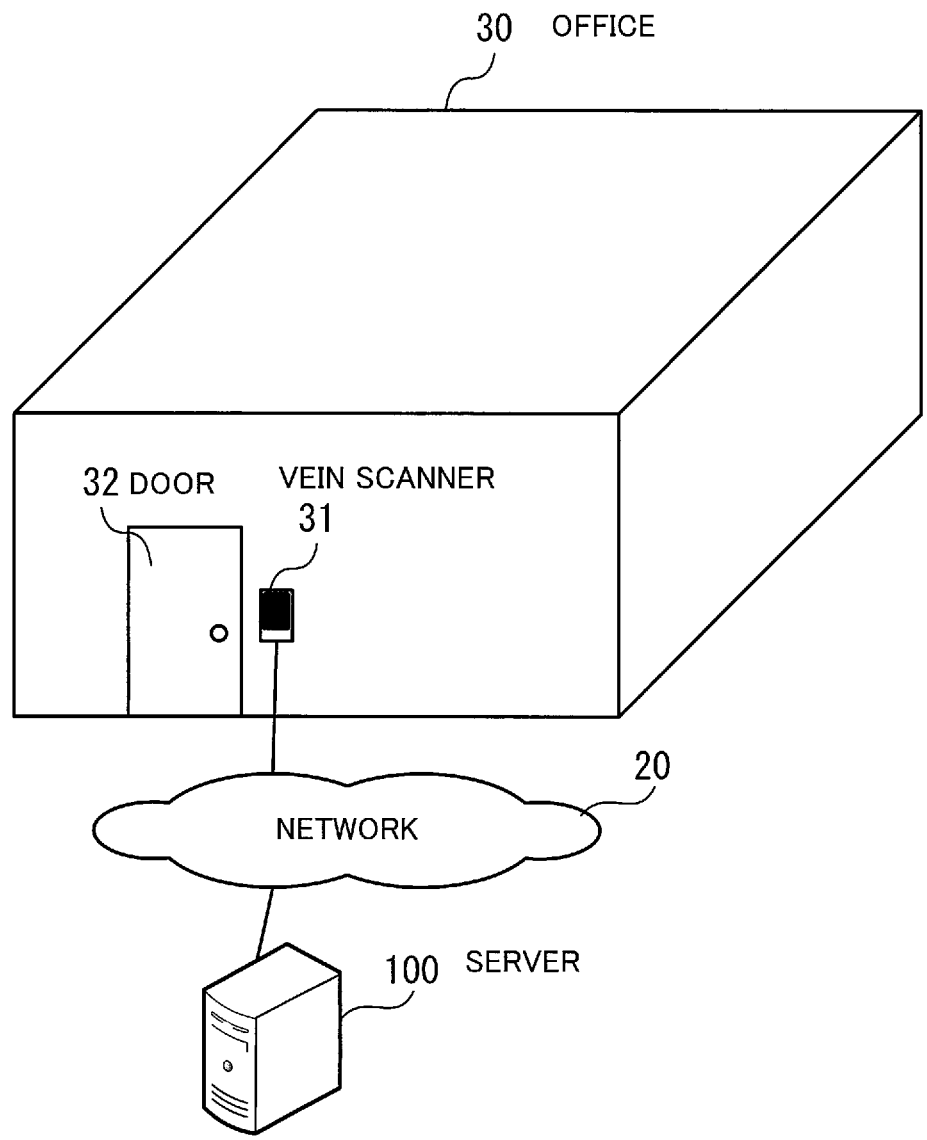
FIG. 2 illustrates an exemplary configuration of a system according to a second embodiment.

FIG. 2 illustrates an exemplary configuration of a system according to the second embodiment. A vein scanner 31 for reading a vein pattern from a palm is installed in the vicinity of the entrance of an office 30. The vein scanner 31 is connected to a server 100 over a network 20. When a person approaching a door 32 places his hand on the vein scanner 31, the vein scanner 31 reads a vein pattern from the palm. Then, the vein scanner 31 sends vein data indicating the vein pattern to the server 100 over the network 20.

The server 100 matches the vein data received from the vein scanner 31 with previously registered vein data of employees. If the server 100 finds employee's vein data matching the received vein data as a result of the matching, the server 100 controls the lock mechanism of the door 32 over the network 20 to unlock the door 32.

Figure 3:
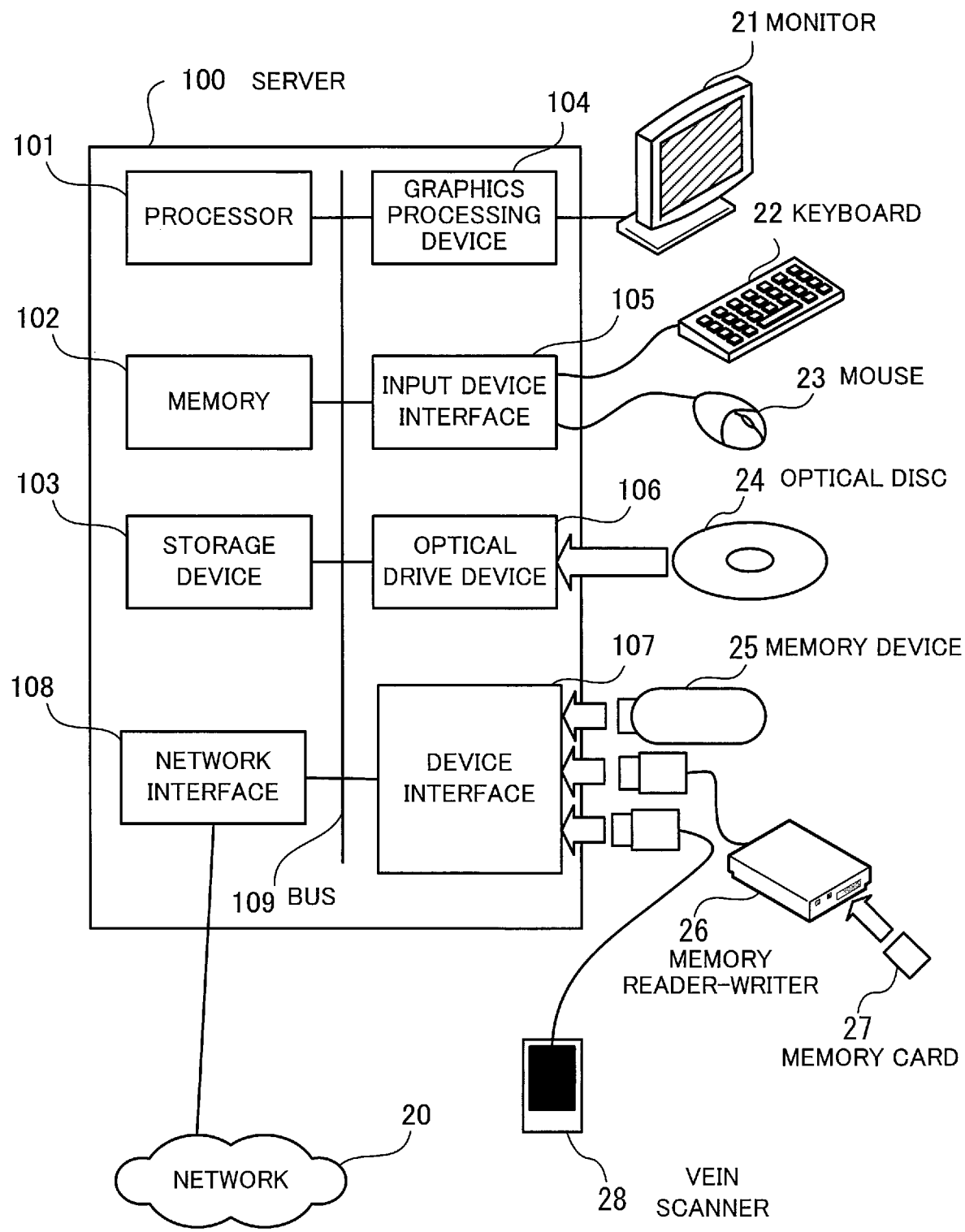
FIG. 3 illustrates an example of a hardware configuration of a server according to the second embodiment.

FIG. 3 illustrates an example of a hardware configuration of a server used in the second embodiment. The server 100 is entirely controlled by a processor 101. A memory 102 and a plurality of peripheral devices are connected to the processor 101 via a bus 109. The processor 101 may be a multiprocessor. The processor 101 is, for example, a CPU, a Micro Processing Unit (MPU), or a Digital Signal Processor (DSP). At least part of functions implemented by the processor 101 executing a program may be implemented by using an Application Specific Integrated Circuit (ASIC), a Programmable Logic Device (PLD), or other electronic circuits.

The memory 102 is used as a main storage device of the server 100. The memory 102 temporarily stores therein at least part of Operating System (OS) programs and application programs to be executed by the processor 101. Also, the memory 102 stores therein a variety of data that is used by the processor 101 in processing. As the memory 102, a volatile semiconductor storage device, such as a Random Access Memory (RAM), may be used, for example.

The peripheral devices connected to the bus 109 include a storage device 103, a graphics processing device 104, an input device interface 105, an optical drive device 106, a device interface 107, and a network interface 108.

The storage device 103 electrically or magnetically reads and writes data on a built-in storage medium. The storage device 103 is used as an auxiliary storage device of the computer. The storage device 103 stores therein OS programs, application programs, and a variety of data. In this connection, as the storage device 103, a Hard Disk Drive (HDD) or a Solid State Drive (SSD) may be used.

A monitor 21 is connected to the graphics processing device 104. The graphics processing device 104 displays images on the display of the monitor 21 in accordance with instructions from the processor 101. As the monitor 21, a display device using a Cathode Ray Tube (CRT) display or a liquid crystal display device may be used.

A keyboard 22 and a mouse 23 are connected to the input device interface 105. The input device interface 105 outputs signals received from the keyboard 22 and mouse 23 to the processor 101. In this connection, the mouse 23 is one example of pointing devices, and another pointing device may be used. Other pointing devices include touchpanels, tablets, touchpads, and trackballs.

The optical drive device 106 reads data from an optical disc 24 with laser light or the like. The optical disc 24 is a portable recording medium on which data is recorded such as to be readable with reflection of light. The optical disc 24 may be a Digital Versatile Disc (DVD), DVD-RAM, CD-ROM (Compact Disc Read Only Memory), CD-R (Recordable), CD-RW (ReWritable), or another.

The device interface 107 is a communication interface that allows peripheral devices to be connected to the server 100. For example, a memory device 25, a memory reader-writer 26, a vein scanner 28, or others may be connected to the device interface 107. The memory device 25 is a recording medium having a function of communicating with the device interface 107. The memory reader-writer 26 reads or writes data on a memory card 27, which is a card-type recording medium. The vein scanner 28 is a device for reading a vein pattern from a human palm.

The network interface 108 is connected to the network 20. The network interface 108 communicates data with another computer or communication device over the network 20.

With the above hardware configuration, the processing functions of the second embodiment are implemented. In this connection, the information processing apparatus 10 of the first embodiment may be implemented by using the same hardware as the server 100 of FIG. 3.

The server 100 implements the processing functions of the second embodiment by executing a program recorded on a computer-readable recording medium, for example. The program describing the processing content to be executed by the server 100 may be recorded on a variety of recording media. For example, the program to be executed by the server 100 may be stored on the storage device 103. The processor 101 loads at least part of the program from the storage device 103 to the memory 102 and then executes the program. Alternatively, the program to be executed by the server 100 may be recorded on the optical disc 24, memory device 25, memory card 27, or another portable recording medium. The program stored in such a portable recording medium becomes executable after being installed on the storage device 103 under the control of the processor 101, for example. Alternatively, the processor 101 may execute the program directly read from a portable recording medium.

The following describes in detail how the server 100 performs a similarity search using feature vectors representing the features of vein data.

(Binary Conversion of Feature Vectors)

First, a conversion of a feature vector to a binary string using a hyperplane will be described. The feature vector that represents the features of vein data is represented by a fixed-length string of floating point numbers, for example. The length (the number of numerical values) of the string represents the number of dimensions.

A similarity between two feature vectors may be expressed by a degree of similarity or non-similarity. The degree of similarity is an index in which a higher value of the index indicates more similarity. The degree of non-similarity is an index in which a lower value of the index indicates more similarity. For example, cosine similarity may be used as a degree of similarity between two feature vectors. When two feature vectors are "(2.0, 4.1, 6.4) and (24.2, 14.3, 96.6)", the cosine similarity between these feature vectors is represented by the following equation (1).

$$sim((2.0, 4.1, 6.4), (24.2, 14.3, 96.6)) = \frac{(2.0, 4.1, 6.4) \cdot (24.2, 14.3, 96.6)}{|(2.0, 4.1, 6.4)| * |(24.2, 14.3, 96.6)|} = 0.9172 \quad (1)$$

In order to calculate a degree of similarity more efficiently than such a calculation of the degree of similarity, the second embodiment converts feature vectors to binary strings. It is now assumed that a feature vector is a vector x, the normal vector of a hyperplane is a vector n, and an offset is d (d is an actual number of 0 or greater). At this time, a hyperplane equation is defined as "(vector x)·(vector n)+d=0".

In the case where a feature vector is converted to a binary string, a multidimensional space with the number of dimensions of the feature vector is divided by using a hyperplane as a boundary. Then, a binary value is given to the feature vector on the basis of which region the feature vector belongs to out of the two regions obtained by dividing the space by the hyperplane. Giving a binary value is equivalent to calculating the following equation (2).

$$b(\vec{x}) = \begin{cases} 1 & \text{if } \vec{x} \cdot \vec{n} + d > 0 \\ 0 & \text{otherwise} \end{cases} \quad (2)$$

Figure 4:
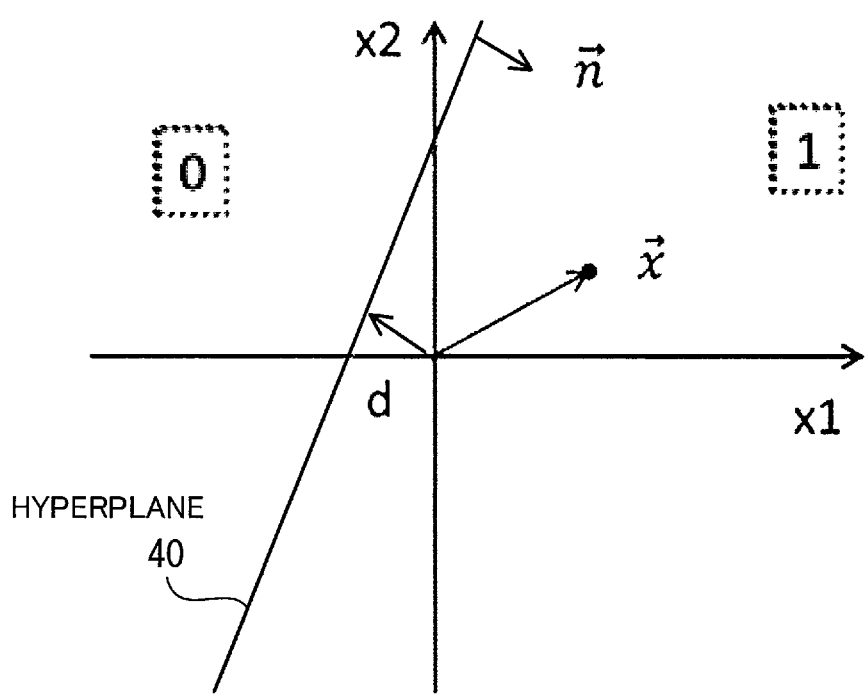
FIG. 4 illustrates a conversion to a binary value geometrically.

FIG. 4 illustrates a conversion to a binary value geometrically. As illustrated in FIG. 4, a binary value "1" is given to a feature vector existing in the direction of the normal vector of a hyperplane 40. A binary value "0" is given to a feature vector existing in the opposite direction of the normal vector of the hyperplane 40.

This operation is performed for B hyperplanes (B is an integer of one or greater), to thereby generate a binary string whose length is B. The generated binary string is referred to as a vector b.

Taking the i-th bit of a binary string "vector b (vector x)" generated from a vector x as "vector b (vector x)$_1$" for clarification purposes, the binary string is represented by the following equation (3).

$$\vec{b}(\vec{x})) = (\vec{b}(\vec{x}))_1, \vec{b}(\vec{x}))_2, \ldots, \vec{b}(\vec{x})_B) \quad (3)$$

Taking the normal vector of an i-th hyperplane as a vector $n^{(i)}$ and an offset thereof as $d^{(i)}$, the value of the i-th bit of the binary string is represented by the following equation (4).

$$\vec{b}(\vec{x})_i = \begin{cases} 1 & \text{if } \vec{x} \cdot \vec{n^{(i)}} + d^{(i)} > 0 \\ 0 & \text{otherwise} \end{cases} \quad (4)$$

In this way, the feature vector is converted to a binary string. Considering binary strings generated as described above, a degree of similarity or non-similarity may be calculated more easily than the cosine similarity calculated by the equation (1).

(Method of Calculating a Degree of Non-Similarity)

A degree of non-similarity between binary strings may be obtained using a hamming distance, for example. A hamming distance between two binary stings (vector $c_1$ and vector $c_2$) is calculated using an exclusive OR (xor) of corresponding bits of the binary strings and a population count of bits set to "1" in the resulting binary string. Taking the population count as "popc( )", the hamming distance between the vector $c_1$ and the vector $c_2$ is represented by the following equation (5).

$$\text{Hamm}(\vec{c}_1, \vec{c}_2) := \text{popc}(\vec{c}_1 \oplus \vec{c}_2) \quad (5)$$

Figure 5:
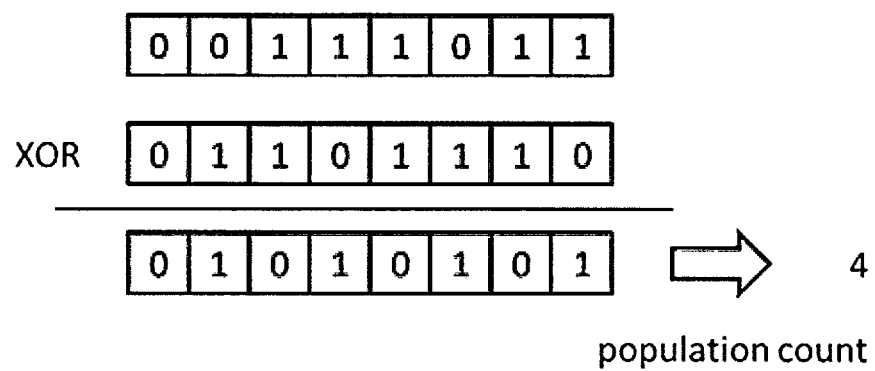
FIG. 5 illustrates an example of calculating a hamming distance.

FIG. 5 illustrates an example of calculating a hamming distance. FIG. 5 illustrates an example of calculating a hamming distance between a vector (0, 0, 1, 1, 1, 0, 1, 1) and a vector (0, 1, 1, 0, 1, 1, 1, 0). As a result of calculating an exclusive OR of corresponding bits of the two vectors, the values of the second, fourth, sixth, and eighth elements are "1" and the values of the other elements are "0". Since four elements each have a value of "1", the population count is "4". That is to say, the hamming distance is "4".

A degree of non-similarity "Sim( )" between feature vectors is defined as the following equation (6), using the hamming distance and conversions of the feature vectors to binary strings in combination.

$$\text{Sim}(\vec{x}, \vec{y}) := \text{Hamm}(\vec{b}(\vec{x}), \vec{b}(\vec{y})) \quad (6)$$

As described above, a degree of non-similarity between two feature vectors is calculated. The above is a basic technique of calculating a degree of non-similarity between feature vectors. For providing a hyperplane with a margin, the second embodiment puts some ideas in a method of converting feature vectors to binary strings and a method of calculating a degree of non-similarity.

(Binary Conversion Taking Margin into Account)

In the second embodiment, two hyperplanes (parallel hyperplanes) parallel to a hyperplane (boundary hyperplane) dividing a space are provided. Three parallel hyperplanes $H_L$, $H_C$, and $H_R$ will be considered. These hyperplanes are represented by the following equations (7).

$$HL: \vec{x} \cdot \vec{n} + d + d_- = 0$$

$$HC: \vec{x} \cdot \vec{n} + d = 0$$

$$HR: \vec{x} \cdot \vec{n} + d - d_+ = 0 \quad (7)$$

"$d_-$" and "$d_+$" are both actual numbers greater than "0". Taking conversion functions to binary strings using the respective hyperplanes as $b_L$, $b_C$, and $b_R$, the conversion functions are defined as the following equations (8), (9), and (10).

$$b_L(\vec{x}) = \begin{cases} 1 & \text{if } \vec{x} \cdot \vec{n^{(i)}} + d^{(i)} + d_-^{(i)} > 0 \\ 0 & \text{otherwise} \end{cases} \quad (8)$$

$$b_C(\vec{x}) = \begin{cases} 1 & \text{if } \vec{x} \cdot \vec{n^{(i)}} + d^{(i)} > 0 \\ 0 & \text{otherwise} \end{cases} \quad (9)$$

$$b_R(\vec{x}) = \begin{cases} 1 & \text{if } \vec{x} \cdot \vec{n^{(i)}} + d^{(i)} - d_+^{(i)} > 0 \\ 0 & \text{otherwise} \end{cases} \quad (10)$$

Three parallel hyperplanes divide a space into four regions.

Figure 6:
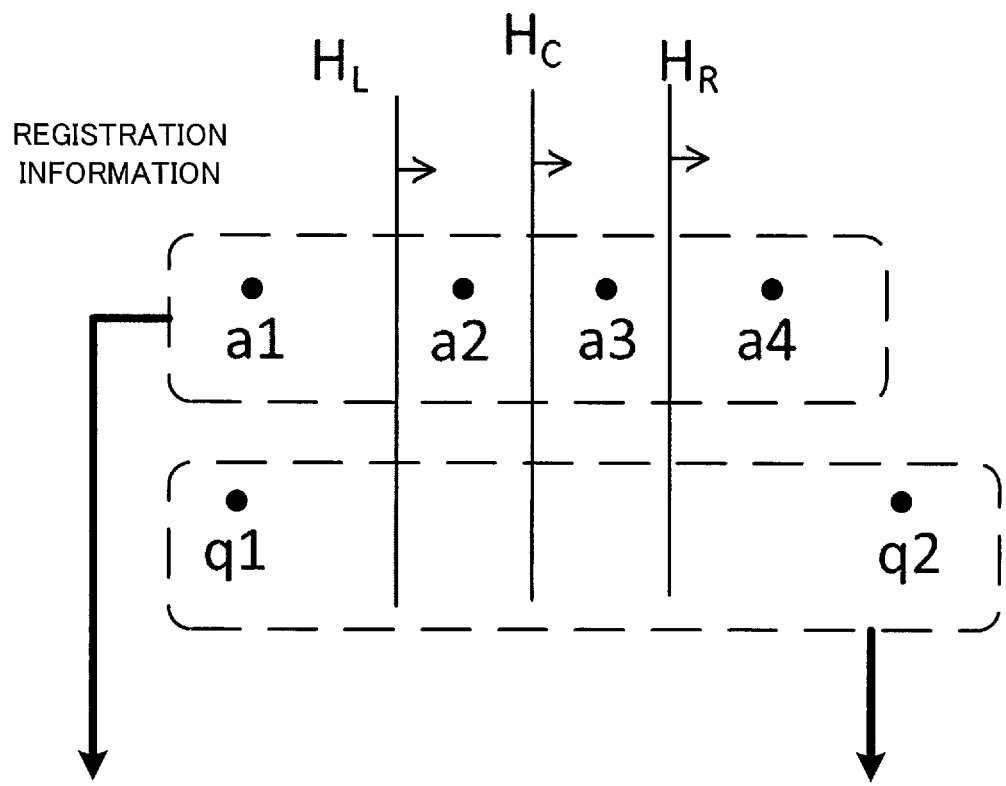
FIG. 6 illustrates regions obtained by dividing a space by hyperplanes and the binary values of vectors belonging to the regions.

FIG. 6 illustrates regions obtained by dividing a space by hyperplanes and the binary values of vectors belonging to the regions. In FIG. 6, points a1, a2, a3, and a4 are given in the respective regions having three hyperplanes $H_L$, $H_C$, and $H_R$ as boundaries. In FIG. 6, the right side of each hyperplane $H_L$, $H_C$, $H_R$ is a front side (side in the direction of the normal vector), and the left side thereof is a back side. The points a1, a2, a3, and a4 are represented by the feature vectors of employees' vein data which are registered in advance as records to be searched in a database of the server 100. Binary values are given to each feature vector registered as a record to be searched, on the basis of the positional relationship between the position of the corresponding point and the individual hyperplanes $H_L$ and $H_R$. That is, a binary value "1" is given to points existing on the front side of a hyperplane $H_L$, $H_R$, and a binary value "0" is given to points existing on the back side thereof.

For example, since the point a1 exists on the left (back) side of each of the hyperplanes $H_L$ and $H_R$, the point a1 is given a value "0" as each binary value $b_L$, $b_R$. In addition, the point a2 exists on the right (front) of the hyperplane $H_L$ and on the left (back) side of the hyperplane $H_R$, the point a2 is given a value of "1" as a binary value $b_L$ and a value of "0" as a binary value $b_R$.

Furthermore, the points q1 and q2 on the both sides of $H_C$ will be considered. Each of the points q1 and q2 is a point that is represented by the feature vector of vein data obtained as a query from a person who is going to enter a room. The feature vector of the query is given a binary value on the basis of the positional relationship between the point represented by the feature vector and the hyperplane $H_C$. That is, a binary value of "1" is given to a point existing on the front side of the hyperplane $H_C$, and a binary value of "0" is given to a point existing on the back side of the hyperplane $H_C$. For example, the point q1 exists on the left (back) side of the hyperplane $H_C$, and therefore a value of "0" is given to the feature vector representing the point q1 as a binary value $H_C$. In addition, the point q2 exists on the right (front) side of the hyperplane $H_C$, and therefore a value of "1" is given to the feature vector representing the point q2 as a binary value $b_C$.

In this connection, in the example of FIG. 6, the position of the point q1 is on the left side of the hyperplane $H_L$. In this connection, any feature vectors whose positions are on the left side of the hyperplane $H_C$ are given the same binary value. Similarity, the position of the point q2 is on the right side of the hyperplane $H_R$. In this connection, any feature vectors whose positions are on the right side of the hyperplane $H_C$ are given the same binary value.

FIG. 6 illustrates binary values based on one hyperplane set (one boundary hyperplane and two parallel hyperplanes). A feature vector is given as many binary values as the number of boundary hyperplanes. As a result, a binary string corresponding to the feature vector is generated.

(Calculation of a Degree of Non-Similarity Taking Margin into Account)

A degree of non-similarity between a feature vector x based on a query and a feature vector y stored in a database will be defined as the following equation (11).

$$MXOR(x,y) := (b_c(x) \oplus b_L(y)) \cdot (b_c(x) \oplus b_R(y)) \quad (11)$$

A circled plus (+) sign represents an exclusive OR operation.

FIG. 7 illustrates examples of calculating a degree of non-similarity. FIG. 7 illustrates results of calculating degrees of non-similarity for combinations of a position represented by a feature vector x based on a query and a position represented by a feature vector y stored in a database. In the examples of FIG. 7, in the case where the feature vector x represents the position of the point q1, the degree of non-similarity is "1" if the feature vector y represents the position of the point a4, and the degree of non-similarity is "0" if the feature vector y represents any of the positions of the points a1 to a3. If the feature vector x represents the point q2, the degree of non-similarity is "1" if the feature vector y represents the position of the point a1, and the degree of non-similarity is "0" if the feature vector y represents any of the positions of the points a2 to a4.

Figure 8:
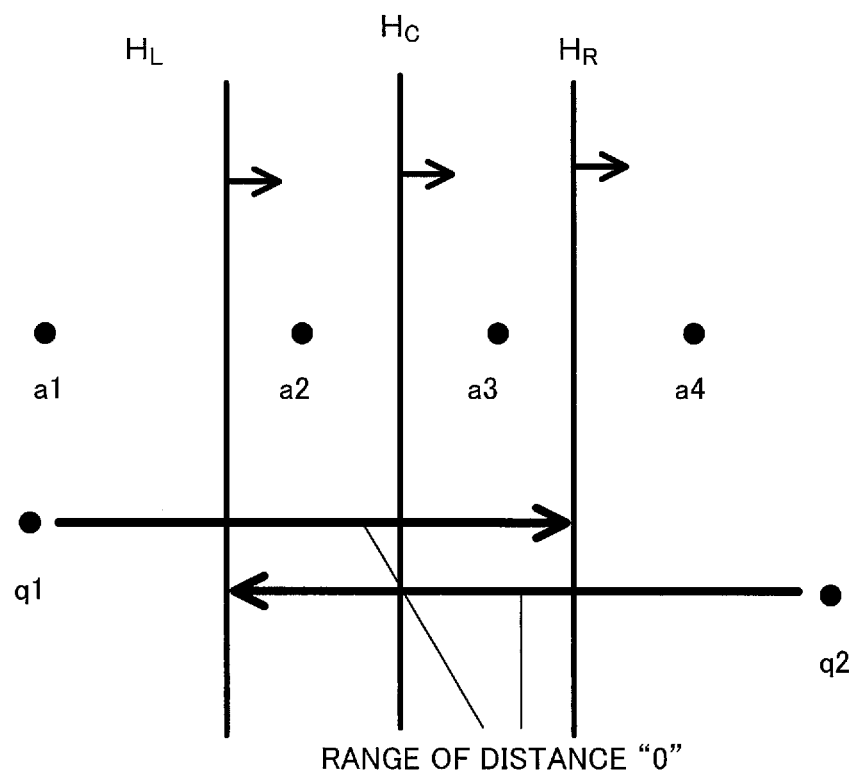
FIG. 8 illustrates a range of a distance "0" from the position represented by a feature vector based on a query.

FIG. 8 illustrates a range of a distance "0" from the position represented by a feature vector based on a query. Considering that a degree of non-similarity MXOR is a kind of distance, reachable ranges of a distance "0" from the respective points q1 and q2 are indicated by thick arrows of FIG. 8. A gap between the hyperplane $H_L$ and the hyperplane $H_R$ is a margin width. If no margin is provided, a reachable range of the distance "0" from each point q1, q2 is a range from the point q1, q2 to the hyperplane $H_C$.

One boundary hyperplane and two parallel hyperplanes parallel to the boundary hyperplane have been described with reference to FIG. 8. Alternatively, a plurality of boundary hyperplanes may be provided. In this case, two parallel hyperplanes parallel to each boundary hyperplane are provided.

Taking three parallel hyperplanes including one boundary hyperplane and its two parallel hyperplanes as one set, B hyperplane sets (B is an integer of one or greater) are provided. In this case, the feature vector is given binary values corresponding to the respective hyperplane sets. When B hyperplane sets are provided, a feature vector is given B binary values. A binary conversion of a feature vector is performed by replacing the feature vector with a binary string in which binary values given to the feature vector are arranged.

A conversion function of converting a feature vector to a binary string uses the following three kinds of vectors (12), (13), and (14): vector $b_L$, vector $b_C$, and vector $b_R$.

$$\vec{b_L}(\vec{x}) = (\vec{b_L}(\vec{x})_1, \vec{b_L}(\vec{x})_2, \ldots, \vec{b_L}(\vec{x})_B) \quad (12)$$

$$\vec{b_L}(\vec{x})_i = \begin{cases} 1 & \text{if } \vec{x} \cdot \vec{n^{(i)}} + d^{(i)} + d_-^{(i)} > 0 \\ 0 & \text{otherwise} \end{cases}$$

$$\vec{b_C}(\vec{x}) = (\vec{b_C}(\vec{x})_1, \vec{b_C}(\vec{x})_2, \ldots, \vec{b_C}(\vec{x})_B) \quad (13)$$

$$\vec{b_C}(\vec{x})_i = \begin{cases} 1 & \text{if } \vec{x} \cdot \vec{n^{(i)}} + d^{(i)} > 0 \\ 0 & \text{otherwise} \end{cases}$$

$$\vec{b_R}(\vec{x}) = (\vec{b_R}(\vec{x})_1, \vec{b_R}(\vec{x})_2, \ldots, \vec{b_R}(\vec{x})_B) \quad (14)$$

$$\vec{b_R}(\vec{x})_i = \begin{cases} 1 & \text{if } \vec{x} \cdot \vec{n^{(i)}} + d^{(i)} + d_+^{(i)} > 0 \\ 0 & \text{otherwise} \end{cases}$$

The degree of non-similarity MSim(x, y) taking a margin into account is defined as the following equation (15) using the degree of non-similarity MXOR(q, a).

$$MSim(x,y) := popc((\vec{b}_C(x) \oplus \vec{b}_L(y)) \cdot (\vec{b}_C(x) \oplus \vec{b}_R(y))) \quad (15)$$

An operation regarding binary strings for calculating a degree of non-similarity taking a margin into account may be defined as following equation (16).

$$MSimB(\vec{b}_C, \vec{b}_L, \vec{b}_R) := popc((\vec{b}_C \oplus \vec{b}_L) \cdot (\vec{b}_C \oplus \vec{b}_R)) \quad (16)$$

Assume that there are "vector $b_L(r)$=(0, 0, 1, 1, 1, 0, 1, 1)" and "vector $b_R(r)$=(0, 0, 1, 0, 0, 0, 0, 1)" as binary strings generated by converting feature vectors previously generated from the vein data of an employee. In addition, assume that a binary string generated by converting the feature vector generated as a query from a person who is going to enter the office 30 is "vector $b_C(q)$=(0, 1, 1, 0, 1, 1, 1, 0)". In this case, MSim(q, r) is calculated as illustrated in FIG. 9.

Figure 9:
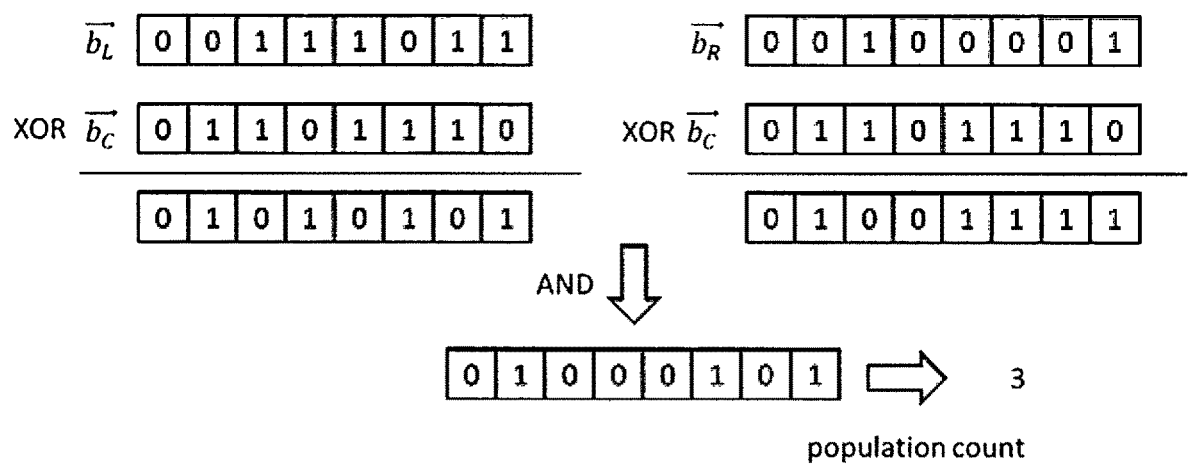
FIG. 9 illustrates an example of calculating a degree of non-similarity.

FIG. 9 illustrates an example of calculating a degree of non-similarity. As illustrated in FIG. 9, first, the exclusive OR of corresponding bits of the vectors $b_L(r)$ and $b_C(q)$ is calculated. Similarly, the exclusive OR of corresponding bits of the vectors $b_R(r)$ and $b_C(q)$ is calculated. Then, a logical AND operation of the results of the two exclusive OR operations is calculated for each bit. Out of the results of calculating the logical AND operation, the number of elements with values of "1" are taken as a degree of non-similarity based on the binary strings of the employee's vein data previously registered and the vein data of the person who is going to enter the room.

If the degree of non-similarity based on the binary strings of the vein data of the person who wants to enter the room and the employee's vein data previously registered is smaller than a prescribed value, a direct comparison is performed between the vein data of the person who wants to enter the room and the employee's vein data previously registered. Then, it is determined based on the degree of similarity obtained by the direct comparison of vein data whether the person who wants to enter the room is an employee or not.

Figure 10:
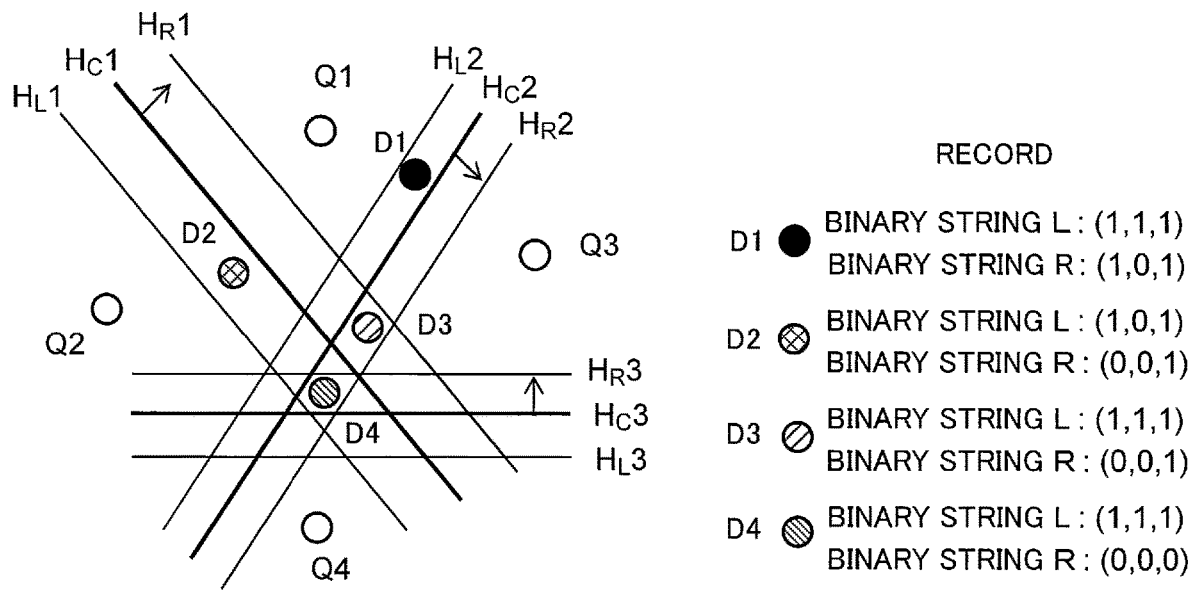
FIG. 10 illustrates examples of calculating a degree of non-similarity.

FIG. 10 illustrates examples of calculating a degree of non-similarity. In the example of FIG. 10, the palm vein data D1 to D4 of employees' palms is previously registered in the server 100 as records. In addition, three hyperplane sets are provided. A first hyperplane set includes hyperplanes $H_L1$, $H_C1$, and $H_R1$. A second hyperplane set includes hyperplanes $H_L2$, $H_C2$, and $H_R2$. A third hyperplane set includes hyperplanes $H_L3$, $H_C3$, and $H_R3$.

In FIG. 10, the positions of the feature vectors generated from the palm vein data D1 to D4 in a multidimensional space are indicated by a shaded circle or filled circle. In the example of FIG. 10, a binary conversion of the feature vector of the palm vein data D1 results in generating a binary string L (1, 1, 1) and a binary string R (1, 0, 1). A binary conversion of the feature vector of the palm vein data D2 results in generating a binary string L (1, 0, 1) and a binary string R(0, 0, 1). A binary conversion of the feature vector of the palm vein data D3 results in generating a binary string L (1, 1, 1) and a binary string R (0, 0, 1). A binary conversion of the feature vector of the palm vein data D4 results in generating a binary string L(1, 1, 1) and a binary string R(0, 0, 0).

Now, consider the case where palm vein data is input as queries Q1 to Q4. In FIG. 10, the positions of the feature vectors generated from the respective queries Q1 to Q4 in the multidimensional space are indicated by white circles. In the example of FIG. 10, a binary conversion of the feature vector of the query Q1 results in generating a binary string C (1, 0, 1). A binary conversion of the feature vector of the query Q2 results in generating a binary string C (0, 0, 1). A binary conversion of the feature vector of the query Q3 results in generating a binary string C (1, 1, 1). A binary conversion of the feature vector of the query Q4 results in generating a binary string C (0, 1, 0).

The results of calculating a degree of non-similarity between each query Q1 to Q4 and each record with the equation (16) are illustrated in the lower portion of FIG. 10. For example, the boundary hyperplane $H_C1$ and the boundary hyperplane $H_C2$ each exist between the feature vector of the query Q1 and the feature vector of the palm vein data D4 registered as a record. That is, the feature vector of the query Q1 and the feature vector of the palm vein data D4 belong to different regions obtained by dividing the space by the two boundary hyperplanes. However, the position represented by the feature vector of the palm vein data D4 exists within a margin range between the boundary hyperplane $H_C1$ and the boundary hyperplane $H_C2$. Therefore, the degree of non-similarity between the feature vector of the query Q1 and the feature vector of the palm vein data D4 is "0".

As described above, if the feature vector of a palm vein registered as a record is within a margin range of a boundary hyperplane, the vector value indicting a distance to a feature vector on either side of the boundary hyperplane is "0", and therefore a low degree of non-similarity is calculated. As a result, it is possible to extract records whose feature vectors are positioned in the vicinity of a hyperplane without fail as records to be matched.

(Determination of Position of Hyperplane)

Each value of a binary string obtained by converting a feature vector as described above depends on the position of a hyperplane. To appropriately classify feature vectors, it is desired that a hyperplane be set so as to divide a region where many feature vectors exist. Therefore, if feature vectors based on the vein data of a plurality of employees are registered, the second embodiment determines the position of a hyperplane on the basis of the registered feature vectors.

Figure 11:
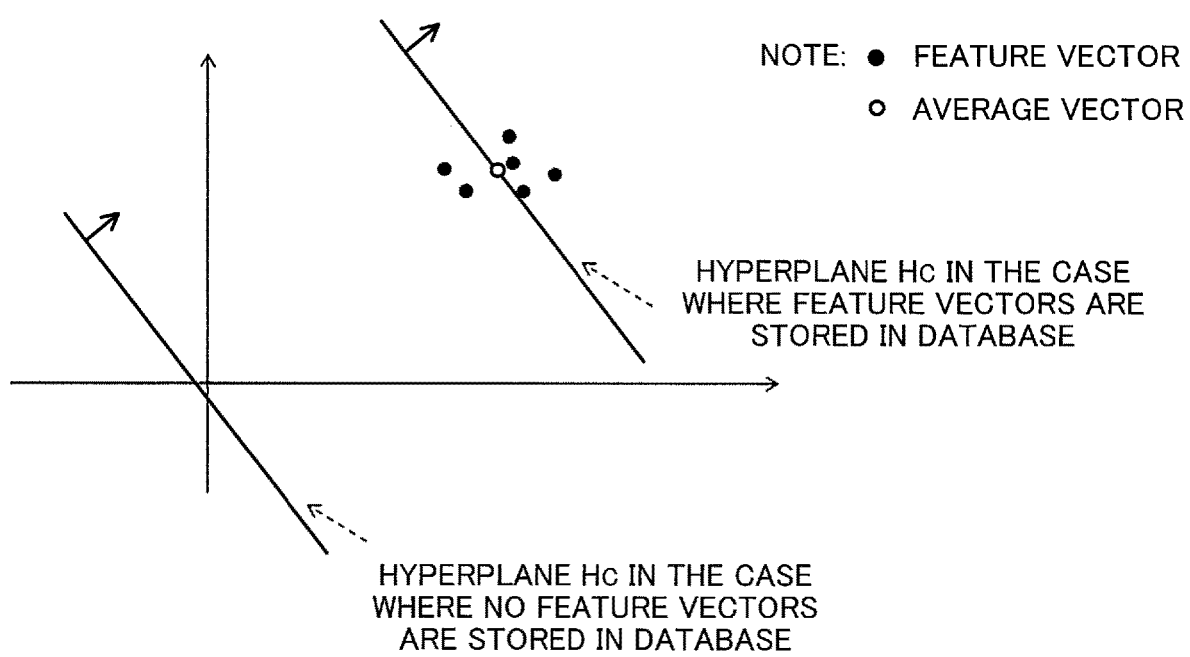
FIG. 11 illustrates an example of how to determine the position of a hyperplane.

FIG. 11 illustrates an example of how to determine the position of a hyperplane. For example, the position of a hyperplane is determined based on the value of an offset d.

The hyperplane $H_C$ divides a region where feature vectors are distributed. At this time, it is appropriate that two regions obtained by the division have almost the same number of feature vectors. However, if no feature vectors based on employees' vein data are stored in a database, it is uncertain how feature vectors are distributed. Therefore, it is not possible to determine where to set the hyperplane $H_C$. To deal with this, in the case where no feature vectors based on employees' vein data are stored in the database, for example, the server 100 generates a normal vector and offset at random.

When data is stored in the database, the distribution of feature vectors may be confirmed. The average vector μ of the feature vectors is one of the distribution characteristics. If the hyperplane $H_C$ includes the average vector μ, it is expected that the regions obtained by the division have almost the same number of feature vectors. In the case where a normal vector $n^{(i)}$ of the hyperplane $H_C$ has been given, the offset may be adjusted with the following equation in order that the hyperplane includes the average vector μ.

$$d^{(i)} = -(\text{average vector } \mu) \cdot (\text{normal vector } n^{(i)})$$

After sampling a normal vector of the hyperplane $H_C$ from a multivariate standard normal distribution, the offset is determined with the above equation, thereby obtaining an appropriate position of the hyperplane. By updating the offset d, the hyperplane $H_C$ may be placed at a position where the number of feature vectors on the front side of the hyperplane $H_C$ and the number of feature vectors on the back side of the hyperplane $H_C$ are equal.

(Details of Individual Authentication by Server 100)

Using the above-described determination of a degree of non-similarity between feature vectors, it is possible to achieve highly-reliable and efficient individual authentication using palm vein.

Figure 12:
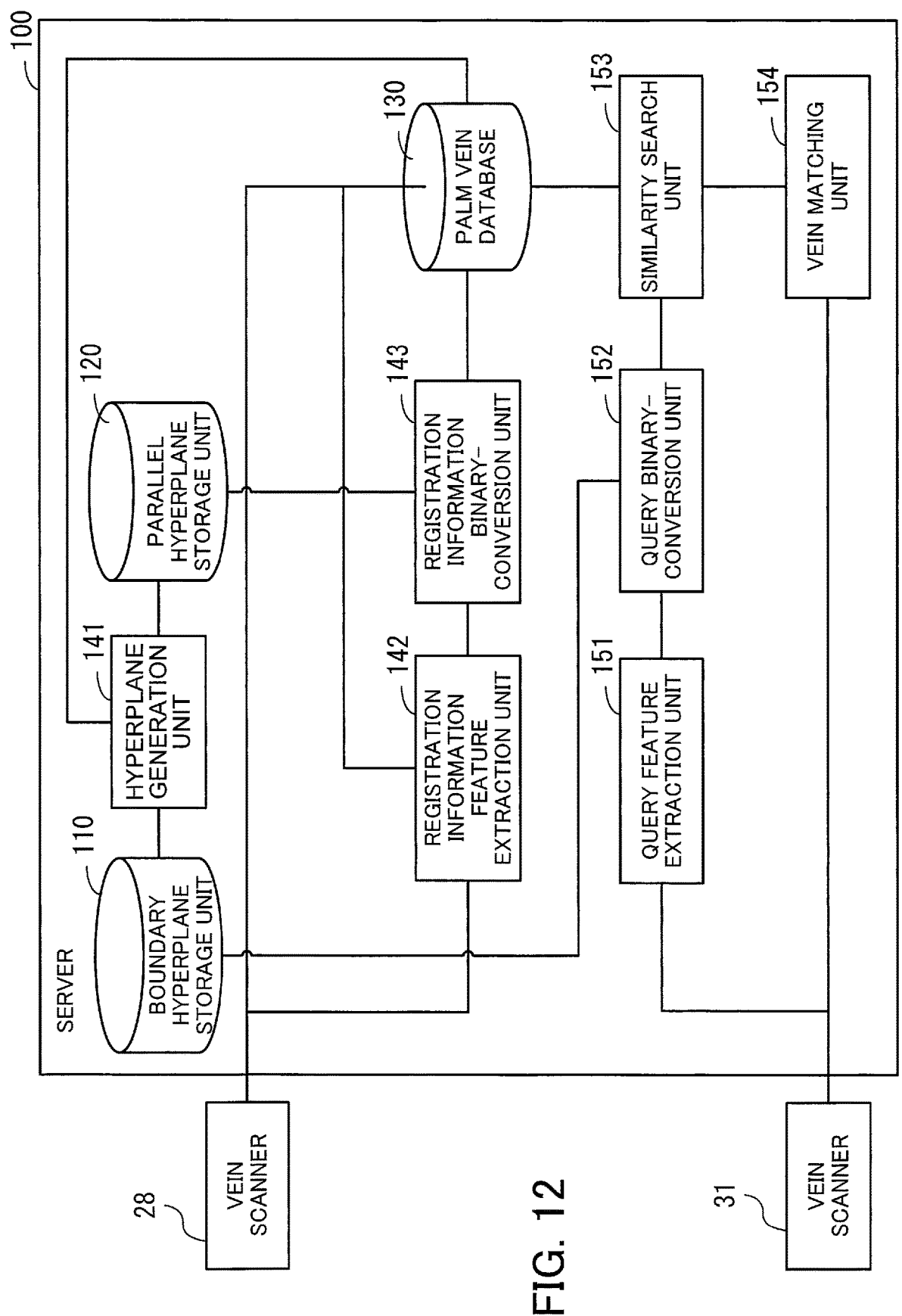
FIG. 12 is a block diagram illustrating an exemplary configuration of a server for performing palm vein authentication.

FIG. 12 is a block diagram illustrating an exemplary configuration of a server for performing palm vein authentication. The server 100 includes a boundary hyperplane storage unit 110, a parallel hyperplane storage unit 120, a palm vein database (DB) 130, a hyperplane generation unit 141, a registration information feature extraction unit 142, a registration information binary-conversion unit 143, a query feature extraction unit 151, a query binary-conversion unit 152, a similarity search unit 153, and a vein matching unit 154.

The boundary hyperplane storage unit 110 stores therein hyperplanes (boundary hyperplane) that are each used as a boundary dividing a multidimensional space where feature vectors are arranged, into two regions. The parallel hyperplane storage unit 120 stores therein hyperplanes (parallel hyperplanes) parallel to each boundary hyperplane. The palm vein database 130 stores therein information on employees' palm vein. The boundary hyperplane storage unit 110, parallel hyperplane storage unit 120, and palm vein database 130 are implemented by using part of the storage area of the memory 102 or storage device 103.

The hyperplane generation unit 141 generates hyperplanes. For example, the hyperplane generation unit 141 generates a boundary hyperplane according to user inputs, and stores the boundary hyperplane in the boundary hyperplane storage unit 110. In addition, when receiving a parallel hyperplane generation instruction, the hyperplane generation unit 141 generates parallel hyperplanes corresponding to each boundary hyperplane stored in the boundary hyperplane storage unit 110. The hyperplane generation unit 141 stores the generated parallel hyperplanes in the parallel hyperplane storage unit 120.

The registration information feature extraction unit 142 analyzes palm vein data received from the vein scanner 28, and generates a feature vector representing the features of the palm vein pattern. The registration information feature extraction unit 142 stores the generated feature vector in association with its original palm vein data in the palm vein database 130. In addition, the registration information feature extraction unit 142 gives the generated feature vector to the registration information binary-conversion unit 143.

The registration information binary-conversion unit 143 refers to parallel hyperplanes stored in the parallel hyperplane storage unit 120, and converts a feature vector to binary strings on the basis of the parallel hyperplanes. The registration information binary-conversion unit 143 stores the generated binary strings in association with their original feature vector in the palm vein database 130.

The query feature extraction unit 151 analyzes palm vein data received from the vein scanner 31, and generates a feature vector representing the features of the palm vein pattern. The query feature extraction unit 151 gives the generated feature vector to the registration information binary-conversion unit 143.

The query binary-conversion unit 152 refers to the boundary hyperplanes stored in the boundary hyperplane storage unit 110, and converts the feature vector to a binary string on the basis of the boundary hyperplanes. The query binary-conversion unit 152 gives the generated binary string to the similarity search unit 153.

The similarity search unit 153 searches the palm vein database 130 to find palm vein information including similar binary strings to the received binary string. The similarity search unit 153 extracts the palm vein data included in the palm vein information found by the search, from the palm vein database 130, and gives the palm vein data to the vein matching unit 154.

The vein matching unit 154 compares each piece of the palm vein data extracted from the palm vein database 130 with the palm vein data obtained from the vein scanner 31, in order to determine whether these pieces of palm vein data are of the same person. If the palm vein data of the same person is found, the vein matching unit 154 determines a success in the individual authentication using palm vein and then unlocks the door 32 of the office 30.

With the above functions, the server 100 is able to perform individual authentication using palm vein. In this connection, lines connecting units in FIG. 12 are part of communication routes, and communication routes other than the illustrated ones may be configured. In addition, the functions of each unit of FIG. 12 are implemented by causing a computer to execute a program module corresponding to the unit, for example.

Figure 13:
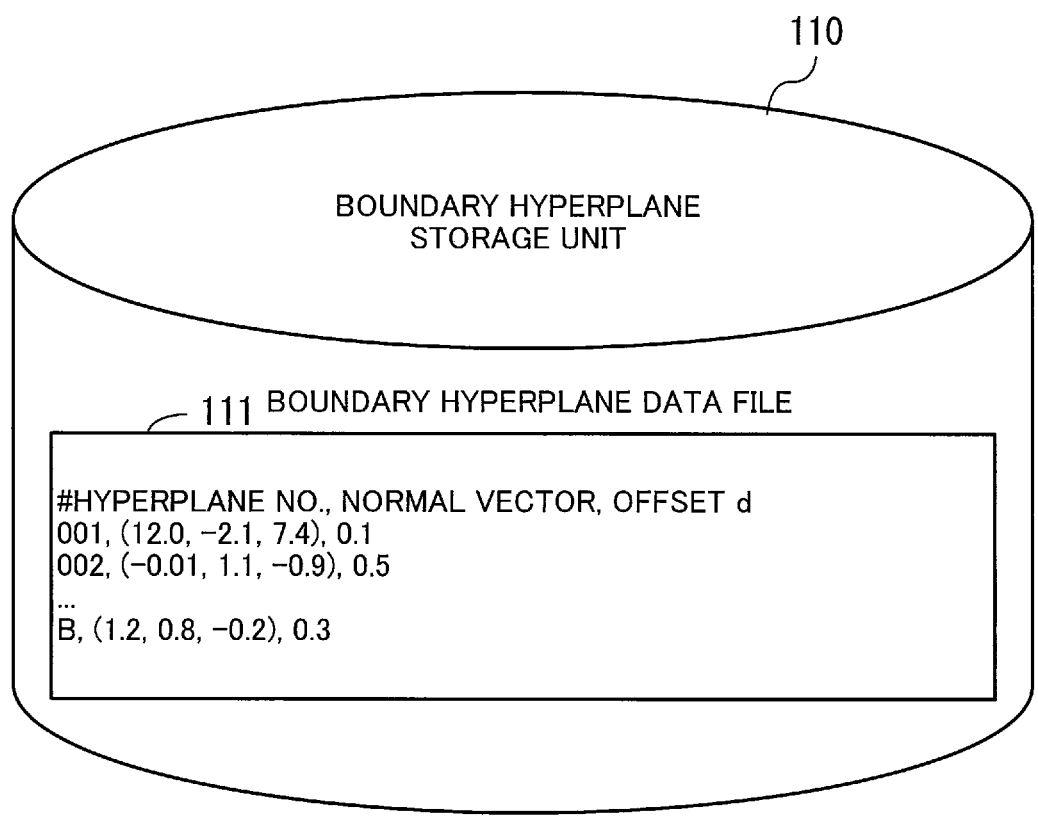
FIG. 13 illustrates an example of a data structure of a boundary hyperplane storage unit.
Figure 14:
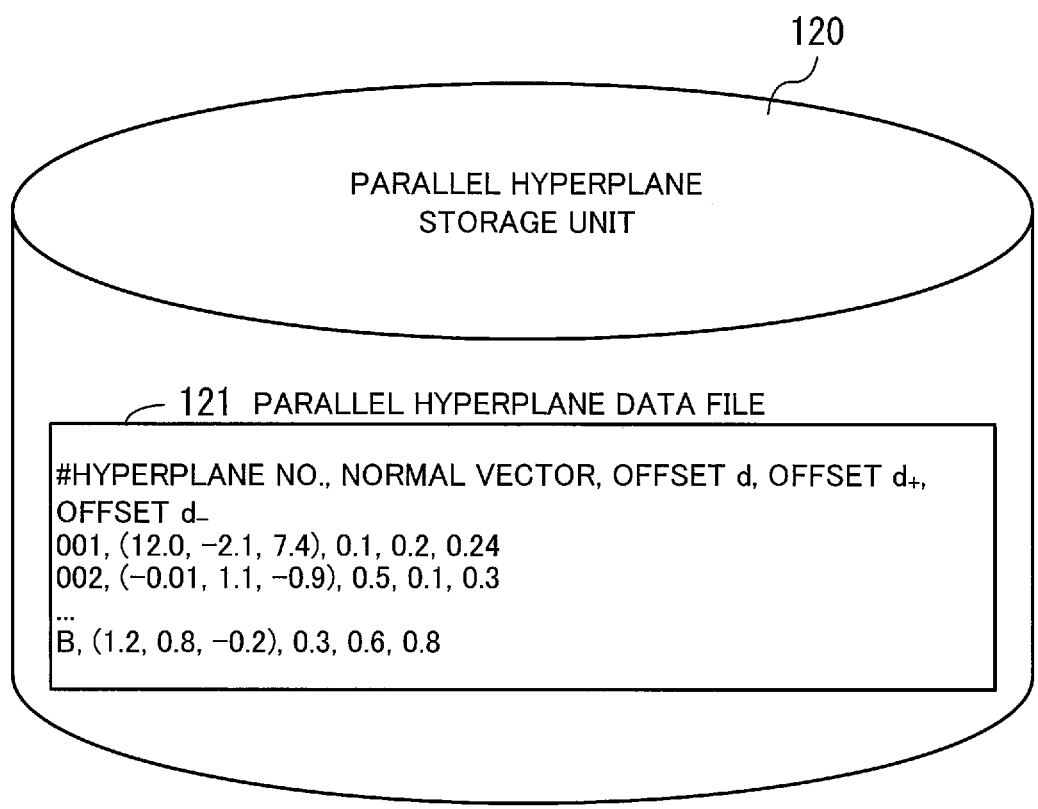
FIG. 14 illustrates an example of a data structure of a parallel hyperplane storage unit.
Figure 15:
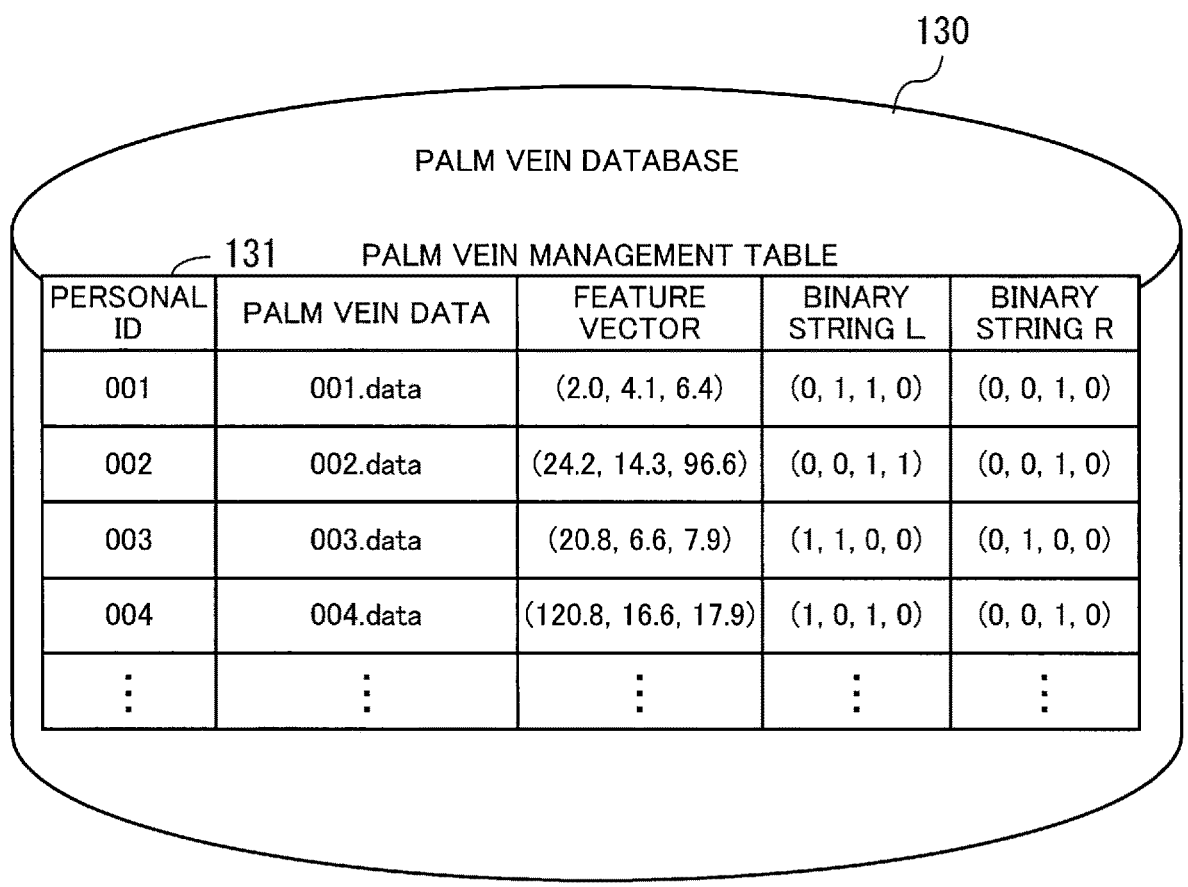
FIG. 15 illustrates an example of a data structure of a palm vein database.

The following descries, in detail, data stored in the boundary hyperplane storage unit 110, parallel hyperplane storage unit 120, and palm vein database 130 with reference to FIGS. 13 to 15.

FIG. 13 illustrates an example of a data structure of a boundary hyperplane storage unit. For example, the boundary hyperplane storage unit 110 includes a boundary hyperplane data file 111 including data specifying boundary hyperplanes. The boundary hyperplane data file 111 contains records each specifying a boundary hyperplane in, for example, Comma-Separated Values (CSV) format. In the example of FIG. 13, a record including a hyperplane number, a normal vector, and an offset d is registered for each boundary hyperplane.

FIG. 14 illustrates an example of a data structure of a parallel hyperplane storage unit. For example, the parallel hyperplane storage unit 120 has a parallel hyperplane data file 121 including data specifying parallel hyperplanes. The parallel hyperplane data file 121 contains records each specifying parallel hyperplanes in, for example, Comma-Separated Values (CSV) format. Referring to the example of FIG. 14, a record including a hyperplane number, a normal vector, an offset d, an offset $d_+$, and an offset $d_-$ is registered for each boundary hyperplane used for generating parallel hyperplanes. The offset $d_+$ is used to define a parallel hyperplane (hyperplane $H_R$) that is provided on the side in the direction of the normal vector of a boundary hyperplane and is parallel to the boundary hyperplane. The offset $d_-$ is used to define a parallel hyperplane (hyperplane $H_L$) that is provided on the opposite side to the direction of the normal vector of the boundary hyperplane and is parallel to the boundary hyperplane. The offset $d_+$ and offset $d_-$ indicate distances between the corresponding parallel hyperplanes and the boundary hyperplane used for generating the parallel hyperplanes, respectively.

FIG. 15 illustrates an example of a data structure of a palm vein database. The palm vein database 130 includes a palm vein management table 131, for example. The palm vein management table 131 includes the following fields: personal ID, palm vein data, feature vector, binary string L, and binary string R.

The personal ID field contains the identifier (personal ID) of an employee allowed to enter the office 30. The palm vein data field contains the employee's palm vein data. The feature vector field contains a vector (feature vector) representing the features of a vein pattern obtained by analyzing the palm vein data. The binary string L field contains a binary string (binary string L) obtained by performing a binary conversion of the feature vector on the basis of a set of hyperplanes $H_L$. The binary string R field contains a binary string (binary string R) obtained by performing a binary conversion of the feature vector on the basis of a set of hyperplanes $H_R$.

With the server 100 configured as above, an identity is efficiently verified using palm vein. To achieve the identity verification, the server 100 first performs a hyperplane generation process.

Figure 16:
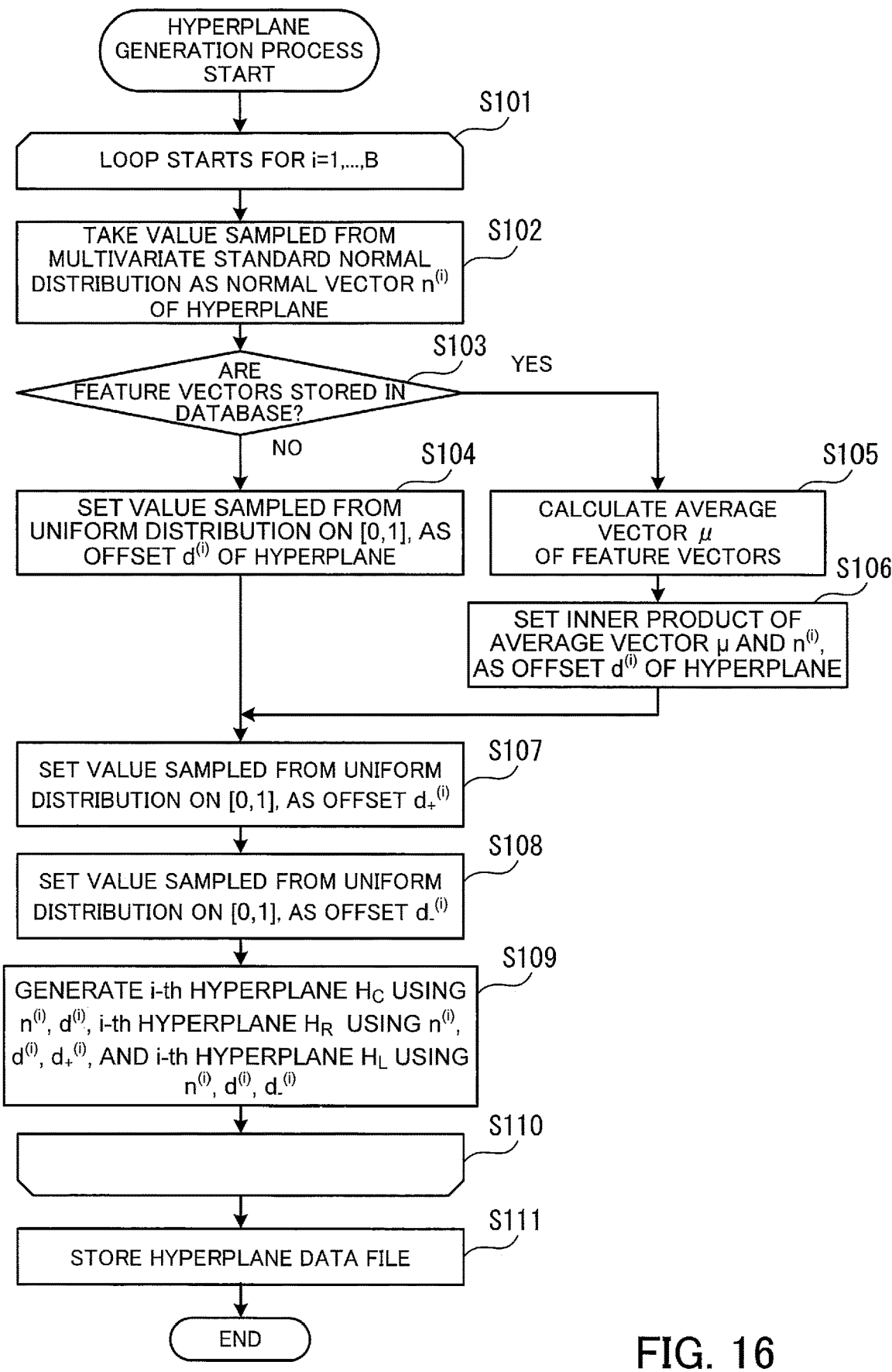
FIG. 16 is a flowchart illustrating an example of a hyperplane generation process.

FIG. 16 is a flowchart illustrating an example of a hyperplane generation process. The process of FIG. 16 will be described step by step. The process of FIG. 16 starts when the hyperplane generation unit 141 receives a hyperplane generation request from a system administrator.

(Step S101) When receiving a hyperplane generation request from a system administrator, the hyperplane generation unit 141 executes steps S102 to S109 on each hyperplane $H_C$ with hyperplane number i=1, . . . , B.

(Step S102) The hyperplane generation unit 141 takes a value sampled from a multivariate standard normal distribution as a normal vector ($n^{(i)}$) of the i-th hyperplane $H_C$.

(Step S103) The hyperplane generation unit 141 determines whether any feature vectors are stored in the palm vein database 130. If feature vectors are stored, the process proceeds to step S105. If no feature vectors are stored, the process proceeds to step S104.

(Step S104) Since no feature vectors are stored, the hyperplane generation unit 141 takes a value sampled from a uniform distribution on [0, 1], as an offset $d^{(i)}$. Then, the process proceeds to step S107.

(Step S105) Since feature vectors are stored, the hyperplane generation unit 141 calculates an average of these feature vectors as an average vector p.

(Step S106) The hyperplane generation unit 141 takes, as an offset $d^{(i)}$, a value obtained by multiplying an inner product of the normal vector $n^{(i)}$ and the average vector μ by "−1". That is, "$d^{(i)}$=−(vector μ)·(vector $n^{(i)}$)" is calculated.

(Step S107) The hyperplane generation unit 141 sets the same vector as the normal vector $n^{(i)}$ of the i-th hyperplane $H_C$, as the normal vector of the i-th hyperplane $H_R$ (parallel hyperplane on the side in the direction of the normal vector). Then, the hyperplane generation unit 141 takes a value sampled from the uniform distribution on [0, 1], as the offset $d_+^{(i)}$.

(Step S108) The hyperplane generation unit 141 sets the same vector as the normal vector $n^{(i)}$ of the i-th hyperplane $H_C$, as the normal vector of the i-th hyperplane $H_L$ (parallel hyperplane on the opposite side to the direction of the normal vector). Then, the hyperplane generation unit 141 takes a value sampled from the uniform distribution on [0, 1], as the offset $d_-^{(i)}$.

(Step S109) The hyperplane generation unit 141 generates a hyperplane $H_C$ on the basis of the normal vector $n^{(i)}$ and offset $d^{(i)}$. In addition, the hyperplane generation unit 141 generates a hyperplane $H_R$ on the basis of the normal vector $n^{(i)}$, offset $d^{(i)}$, and offset $d_+^{(i)}$. In addition, the hyperplane generation unit 141 generates a hyperplane $H_L$ on the basis of the normal vector $n^{(i)}$, offset $d^{(i)}$, and offset $d_-^{(i)}$.

(Step S110) When the hyperplane generation unit 141 completes the generation of B hyperplane sets corresponding to the hyperplane number i=1, . . . , B, the process proceeds to step S111.

(Step S111) The hyperplane generation unit 141 stores the generated hyperplanes. For example, the hyperplane generation unit 141 generates a boundary hyperplane data file 111 containing records respectively indicating the B hyperplanes $H_C$. The records indicating the hyperplanes $H_C$ each include a hyperplane number, normal vector $n^{(i)}$ and offset $d^{(i)}$. The hyperplane generation unit 141 stores the generated boundary hyperplane data file 111 in the boundary hyperplane storage unit 110.

In addition, the hyperplane generation unit 141 generates a parallel hyperplane data file 121 containing records respectively indicating B hyperplane sets (hyperplane $H_C$, hyperplane $H_R$, and hyperplane $H_L$). A record indicating a hyperplane set includes a hyperplane number, normal vector $n^{(i)}$, offset $d^{(i)}$, offset $d^{(i)}$, and offset $d^{(i)}$. A hyperplane $H_R$ is defined by the normal vector $n^{(i)}$, offset $d^{(i)}$, and offset $d^{(i)}$. A hyperplane $H_L$ is defined by the normal vector $n^{(i)}$, offset $d^{(i)}$, and offset $d^{(i)}$. The hyperplane generation unit 141 stores the generated parallel hyperplane data file 121 in the parallel hyperplane storage unit 120.

A binary conversion of a feature vector representing the features of palm vein data is performed on the basis of the hyperplanes generated as described above. The binary conversion is performed, for example, when a request (data registration request) to register employee's palm vein data is entered or when a request (search and matching request) to perform a search and matching process using the palm vein data of a person who is going to enter the office 30 is entered as a query.

Figure 17:
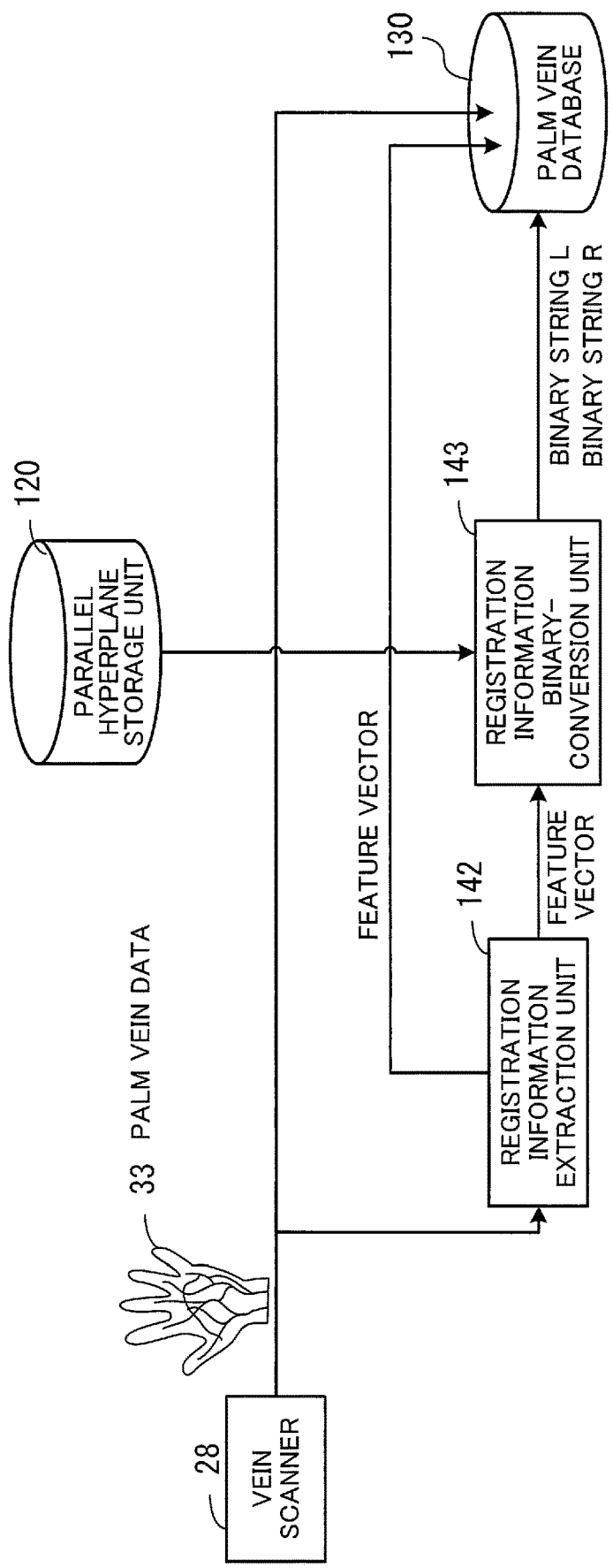
FIG. 17 illustrates an example of a data registration process in response to a data registration request.

FIG. 17 illustrates an example of a data registration process in response to a data registration request. When receiving a data registration request, the server 100 obtains palm vein data 33 from the vein scanner 28, for example, and stores the palm vein data 33 in both the palm vein database 130 and the registration information feature extraction unit 142. The registration information feature extraction unit 142 analyzes the features of a vein pattern indicated by the received palm vein data 33 to generate a feature vector. The registration information feature extraction unit 142 registers the generated feature vector in association with the palm vein data 33 in the palm vein database 130. In addition, the registration information feature extraction unit 142 gives the generated feature vector to the registration information binary-conversion unit 143.

The registration information binary-conversion unit 143 refers to the parallel hyperplane storage unit 120 to convert the received feature vector to two binary stings (binary string L and binary string R). The registration information binary-conversion unit 143 registers the generated binary strings in association with their original feature vector in the palm vein database 130.

The following describes in detail the data registration process.

Figure 18:
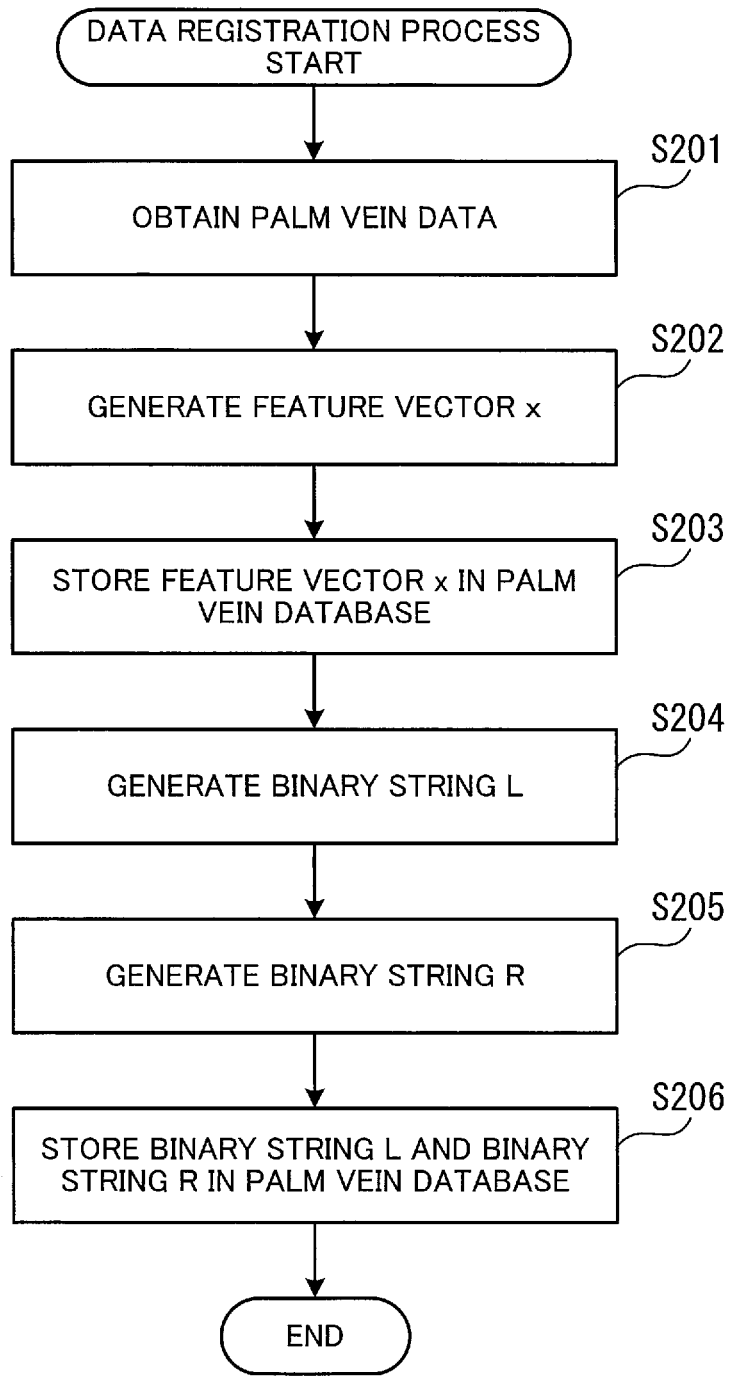
FIG. 18 is a flowchart illustrating an exemplary procedure of the data registration process.

FIG. 18 is a flowchart illustrating an exemplary procedure of the data registration process. The following descries the process of FIG. 18 step by step.

(Step S201) The server 100 causes the palm vein scanner 28 to read the palm vein data of an employee and obtains the palm vein data from the palm vein scanner 28. The obtained palm vein data is stored in the palm vein database 130 and also supplied to the registration information feature extraction unit 142.

(Step S202) The registration information feature extraction unit 142 calculates the amount of features representing connections of veins from the palm vein data. The registration information feature extraction unit 142 generates a feature vector x having a plurality of feature amounts calculated for a plurality of indexes as elements.

(Step S203) The registration information feature extraction unit 142 stores the generated feature vector x in association with its original palm vein data in the palm vein database 130. The registration information feature extraction unit 142 gives the generated feature vector x to the registration information binary-conversion unit 143.

(Step S204) The registration information binary-conversion unit 143 performs a conversion to binary values with respect to B hyperplanes $H_L$, using the feature vector x as an input to the equation (12), and then generates a binary string L that has a length of B.

(Step S205) The registration information binary-conversion unit 143 performs a conversion to binary values with respect to B hyperplanes $H_R$, using the feature vector x as an input to the equation (14), and then generates a binary string R that has a length of B.

(Step S206) The registration information binary-conversion unit 143 stores the generated binary string L and binary string R in association with their original feature vector x in the palm vein database 130.

As described above, the palm vein pattern based on the employee's palm vein data is registered in the palm vein database 130. Then, when a person who wants to enter the office 30 places his palm on the vein scanner 31, a search and matching process is performed.

Figure 19:
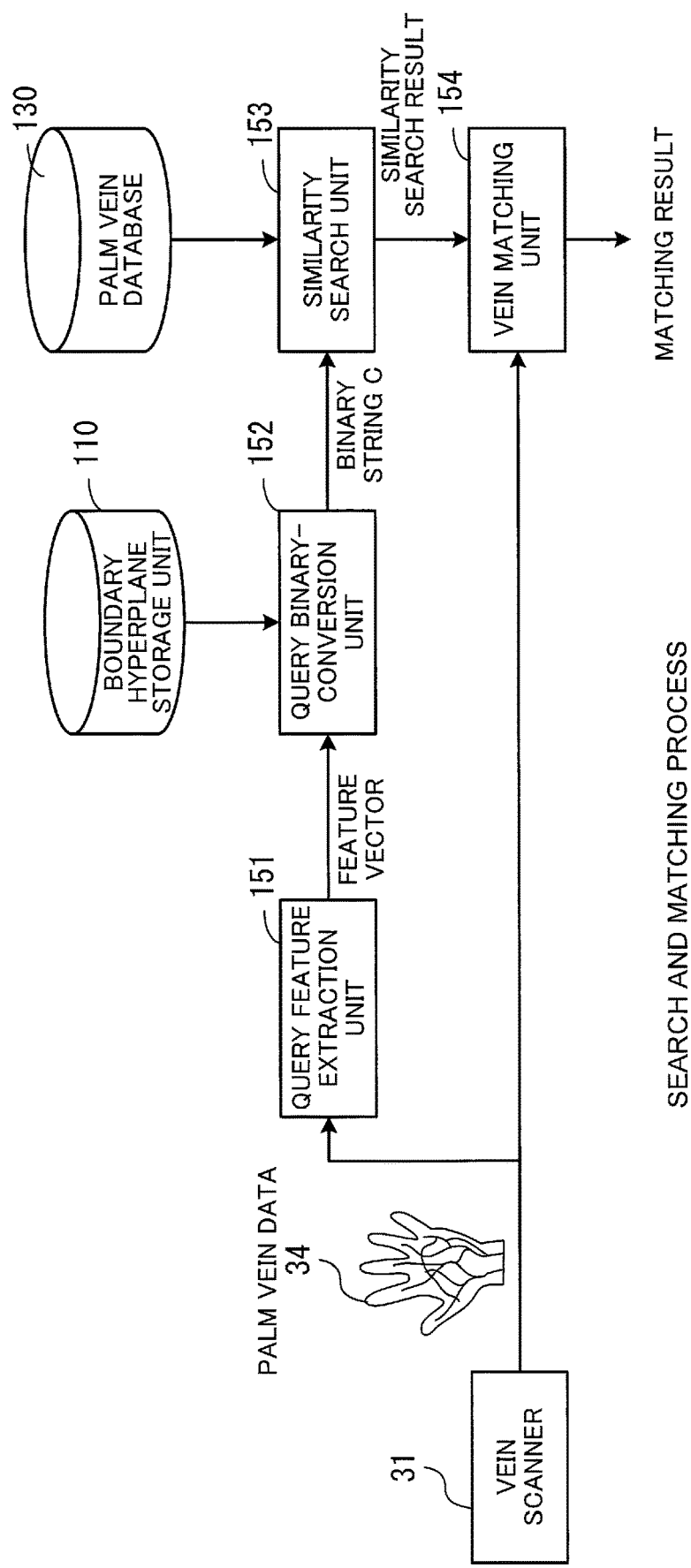
FIG. 19 illustrates an example of a search and matching process.

FIG. 19 illustrates an example of a search and matching process. Palm vein data 34 read by the vein scanner 31 is sent to the server 100, and is supplied to the query feature extraction unit 151 and vein matching unit 154. The query feature extraction unit 151 generates a feature vector from the palm vein data, and gives the feature vector to the query binary-conversion unit 152. The query binary-conversion unit 152 converts the received feature vector to a binary string C on the basis of hyperplanes stored in the boundary hyperplane storage unit 110. The binary string C generated by the binary conversion is supplied to the similarity search unit 153.

The similarity search unit 153 searches the palm vein database 130 to find a record in which a degree of non-similarity to the binary string C is less than or equal to a prescribed value. Records found by this search are supplied to the vein matching unit 154 as similarity search results. The vein matching unit 154 matches the palm vein data included in the similarity search results with the palm vein data 34 read by the vein scanner 31. Then, the vein matching unit 154 outputs a record including palm vein data obtained from the same person as the palm vein data 34, as a matching result.

The following describes the search and matching process in detail.

Figure 20:
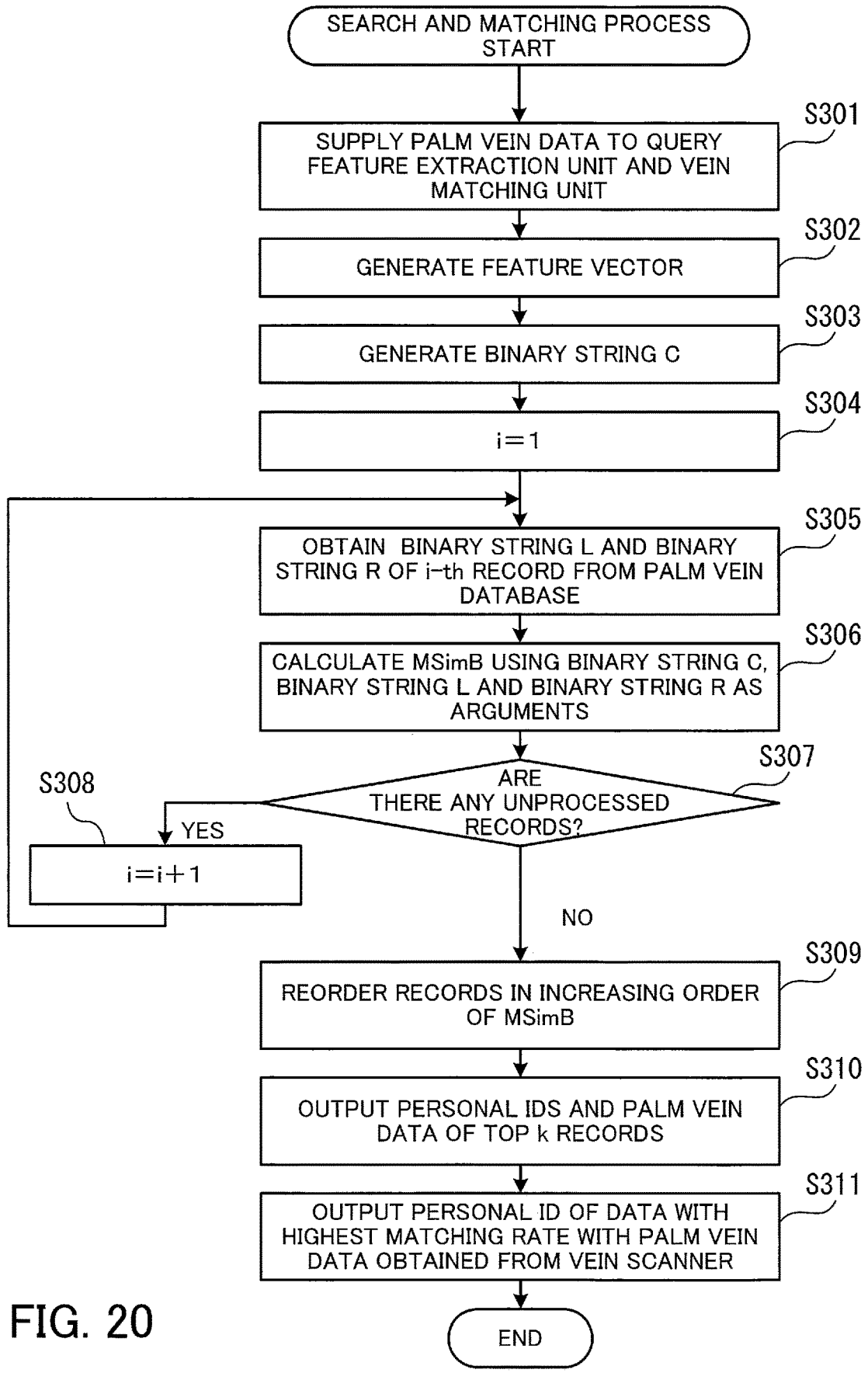
FIG. 20 is a flowchart illustrating the search and matching process.

FIG. 20 is a flowchart illustrating the search and matching process. The process of FIG. 20 will be described step by step.

(Step S301) When a person who is going to enter the office 30 places his palm on the vein scanner 31, the server 100 causes the vein scanner 31 to read palm vein data. Then, the server 100 obtains the palm vein data from the vein scanner 31, and supplies the palm vein data to the query feature extraction unit 151 and vein matching unit 154.

(Step S302) The query feature extraction unit 151 calculates feature amounts representing connections of veins from the palm vein data and others. Then, the query feature extraction unit 151 generates a feature vector x having the plurality of feature amounts calculated for a plurality of indexes as elements. Then, the query feature extraction unit 151 gives the generated feature vector to the query binary-conversion unit 152.

(Step S303) The query binary-conversion unit 152 performs a conversion to binary values with respect to the B hyperplanes $H_C$, using the obtained feature vector as an input to the equation (13), to thereby generate a binary string C that has a length of B. The query binary-conversion unit 152 gives the generated binary string C to the similarity search unit 153.

(Step S304) The similarity search unit 153 sets the variable i to 1.

(Step S305) The similarity search unit 153 obtains the binary string L and binary string R from the i-th record in the palm vein database 130.

(Step S306) The similarity search unit 153 calculates a degree of non-similarity MSimB, using the binary string C, binary string L, and binary string R as arguments. More specifically, the similarity search unit 153 calculates the MSimB, using the binary string C of the query as the first argument of MSimB, the binary string L of the i-th record as the second argument of MSimB, and the binary string R of the i-th record as the third argument of MSimB. The similarity search unit 153 takes the evaluation value obtained as the result of calculating MSimB, as the degree of non-similarity between the query and the i-th record.

(Step S307) The similarity search unit 153 determines whether there are any unprocessed records in the palm vein database 130. If any unprocessed records exist, the process proceeds to step S308. If no unprocessed records exist, the process proceeds to step S309.

(Step S308) The similarity search unit 153 adds "1" to i, and then the process proceeds to step S305.

(Step S309) The similarity search unit 153 reorders the records in the palm vein database 130 in increasing order of the degree of non-similarity MSimB.

(Step S310) The similarity search unit 153 outputs the personal IDs and palm vein data of the top k records (k is an integer of one or greater) to the vein matching unit 154 as similarity search results. It is assumed that the value of "k" is given by the system administrator in advance.

(Step S311) The vein matching unit 154 matches the palm vein data obtained from the vein scanner 31 with the k pieces of palm vein data that are the similarity search results. Then, the vein matching unit 154 outputs the personal ID of the palm vein data whose matching rate with the palm vein data obtained from the vein scanner 31 is the highest among the palm vein data included in the similarity search results, as a matching result. At this time, the vein matching unit 154 may include a numerical value indicating the matching level obtained by the matching, in the matching result. Furthermore, the vein matching unit 154 may output an unlock signal for unlocking the door 32 when the numerical value indicating the matching level is equal to or greater than a prescribed threshold.

As described above, the individual authentication using palm vein may be performed efficiently. That is, the second embodiment makes it possible to provide the same effects as the case using wildcards, using memories installed in general-purpose computers, and therefore a wider range of resources are applicable. In addition, it is possible to reduce failures in extraction.

That is, in the second embodiment, two kinds of binary strings are held in each record to be searched, and palm vein data entered as a query is converted to a binary string, and the binary string and the binary strings in each record are compared, thereby calculating a degree of non-similarity. It is possible to perform logical operations between binary strings at a high speed using a general-purpose computer, using a bit operation and population count. This approach makes it possible to extract records similar to palm vein data entered as a query, from a large number of records at a high speed.

In this connection, the second embodiment describes an example of using palm vein data as data used for matching. The technique of the second embodiment is applicable to matching for various kinds of data that represents features using feature vectors. For example, the technique is applicable to matching for biometric data, such as fingerprint data or retina data, or other unstructured data.

According to one aspect, it is possible to reduce an increase in the processing load of similarity determination by providing a hyperplane with a margin.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
    a memory which stores therein hyperplane information indicating a plurality of hyperplane sets, each of the plurality of hyperplane sets including a first hyperplane, a second hyperplane, and a third hyperplane that are provided in a space of a prescribed number of dimensions, the second hyperplane being provided on a side in a direction of a normal vector of the first hyperplane and in parallel to the first hyperplane with a prescribed gap between the second hyperplane and the first hyperplane, the third hyperplane being provided on an opposite side to the direction of the normal vector of the first hyperplane and in parallel to the first hyperplane with a prescribed gap between the third hyperplane and the first hyperplane, a plurality of first hyperplanes included in the plurality of hyperplane sets having normal vectors different from one another; and
    a processor which performs a procedure including
        obtaining, for each of the plurality of hyperplane sets, a first feature vector representing a feature of first comparison data as a position within the space,
        generating, for each of the plurality of hyperplane sets, a first one-bit binary value, based on whether the position represented by the first feature vector is in the direction of the normal vector relative to the second hyperplane,
        generating, for each of the plurality of hyperplane sets, a second one-bit binary value, based on whether the position represented by the first feature vector is in the direction of the normal vector relative to the third hyperplane,
        obtaining, for each of the plurality of hyperplane sets, a second feature vector indicating a feature of second comparison data as a position within the space,
        generating, for each of the plurality of hyperplane sets, a third one-bit binary value, based on whether the position represented by the second feature vector is in the direction of the normal vector relative to the first hyperplane,
        multiplying, for each of the plurality of hyperplane sets, results of a first exclusive OR of the first one-bit binary value and the third one-bit binary value and a second exclusive OR of the second one-bit binary value and the third one-bit binary value, and
        determining a degree of similarity between the first comparison data and the second comparison data, based on a sum of results of the multiplying obtained for the plurality of hyperplane sets.

2. The information processing apparatus according to claim 1, wherein
    the first feature vector is provided in plurality, and the memory stores therein the plurality of first feature vectors, and
    the procedure further includes generating the first hyperplane passing through a position represented by an average vector of the plurality of first feature vectors, generating the second hyperplane and the third hyperplane according to the generated first hyperplane, and storing the hyperplane information indicating the first hyperplane, the second hyperplane, and the third hyperplane in the memory.

3. A data comparison method comprising:
    storing hyperplane information indicating a plurality of hyperplane sets, each of the plurality of hyperplane sets including a first hyperplane, a second hyperplane, and a third hyperplane that are provided in a space of a prescribed number of dimensions, in a memory, the second hyperplane being provided on a side in a direction of a normal vector of the first hyperplane and in parallel to the first hyperplane with a prescribed gap between the second hyperplane and the first hyperplane, the third hyperplane being provided on an opposite side to the direction of the normal vector of the first hyperplane and in parallel to the first hyperplane with a prescribed gap between the third hyperplane and the first hyperplane, a plurality of first hyperplanes included in the plurality of hyperplane sets having normal vectors different from one another;

obtaining, for each of the plurality of hyperplane sets, a first feature vector representing a feature of first comparison data as a position within the space;

generating, for each of the plurality of hyperplane sets, by a processor, a first one-bit binary value, based on whether the position represented by the first feature vector is in the direction of the normal vector relative to the second hyperplane;

generating, for each of the plurality of hyperplane sets, by the processor, a second one-bit binary value, based on whether the position represented by the first feature vector is in the direction of the normal vector relative to the third hyperplane;

obtaining, for each of the plurality of hyperplane sets, a second binary vector representing a feature of second comparison data as a position within the space;

generating, for each of the plurality of hyperplane sets, by the processor, a third one-bit binary value, based on whether the position represented by the second feature vector is in the direction of the normal vector relative to the first hyperplane;

multiplying, for each of the plurality of hyperplane sets, by the processor, results of a first exclusive OR of the first one-bit binary value and the third one-bit binary value and a second exclusive OR of the second one-bit binary value and the third one-bit binary value; and determining, by the processor, a degree of similarity between the first comparison data and the second comparison data, based on a sum of results of the multiplying obtained for the plurality of hyperplane sets.

4. A non-transitory computer-readable storage medium storing a computer program that causes a computer to perform a process comprising:

storing, in a memory, hyperplane information indicating a plurality of hyperplane sets, each of the plurality of hyperplane sets including a first hyperplane, a second hyperplane, and a third hyperplane that are provided in a space of a prescribed number of dimensions, the second hyperplane being provided on a side in a direction of a normal vector of the first hyperplane and in parallel to the first hyperplane with a prescribed gap between the second hyperplane and the first hyperplane, the third hyperplane being provided on an opposite side to the direction of the normal vector of the first hyperplane and in parallel to the first hyperplane with a prescribed gap between the third hyperplane and the first hyperplane, a plurality of first hyperplanes included in the plurality of hyperplane sets having normal vectors different from one another;

obtaining, for each of the plurality of hyperplane sets, a first feature vector representing a feature of first comparison data as a position within the space;

generating, for each of the plurality of hyperplane sets, a first one-bit binary value, based on whether the position represented by the first feature vector is in the direction of the normal vector relative to the second hyperplane;

generating, for each of the plurality of hyperplane sets, a second one-bit binary value, based on whether the position represented by the first feature vector is in the direction of the normal vector relative to the third hyperplane;

obtaining, for each of the plurality of hyperplane sets, a second binary vector representing a feature of second comparison data as a position within the space;

generating, for each of the plurality of hyperplane sets, a third one-bit binary value, based on whether the position represented by the second feature vector is in the direction of the normal vector relative to the first hyperplane;

multiplying, for each of the plurality of hyperplane sets, results of a first exclusive OR of the first one-bit binary value and the third one-bit binary value and a second exclusive OR of the second one-bit binary value and the third one-bit binary value; and determining a degree of similarity between the first comparison data and the second comparison data, based on a sum of results of the multiplying obtained for the plurality of hyperplane sets.

* * * * *